(12) United States Patent
Tong et al.

(10) Patent No.: US 10,748,320 B2
(45) Date of Patent: Aug. 18, 2020

(54) ANIMATION SIMULATION OF BIOMECHANICS

(71) Applicant: Intel Corporation, Santa Clara, CA (US)

(72) Inventors: Xiaofeng Tong, Beijing (CN); Yuanzhang Chang, Beijing (CN); Qiang Li, Beijing (CN); Wenlong Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/326,888

(22) PCT Filed: Sep. 20, 2016

(86) PCT No.: PCT/CN2016/099442
§ 371 (c)(1),
(2) Date: Feb. 20, 2019

(87) PCT Pub. No.: WO2018/053682
PCT Pub. Date: Mar. 29, 2018

(65) Prior Publication Data
US 2019/0180493 A1    Jun. 13, 2019

(51) Int. Cl.
*G06T 13/40* (2011.01)
*A63B 69/00* (2006.01)
(Continued)

(52) U.S. Cl.
CPC .............. *G06T 13/40* (2013.01); *A63B 69/00* (2013.01); *G06F 3/011* (2013.01); *G06F 3/017* (2013.01);
(Continued)

(58) Field of Classification Search
CPC ......... G06T 13/40; G06T 3/4007; G06T 7/20; G06T 2215/16; G06F 3/011; G06F 3/017; A63B 69/00
See application file for complete search history.

(56) References Cited

U.S. PATENT DOCUMENTS

2008/0158232 A1    7/2008    Shuster
2009/0112906 A1    4/2009    Shuster
(Continued)

FOREIGN PATENT DOCUMENTS

CN    103093490 A    5/2013
WO    WO2015139231 A1    9/2015

OTHER PUBLICATIONS

International Search Report and Written Opinion dated Jun. 22, 2017 for International Patent Application No. PCT/CN2016/099442, 11 pages.

*Primary Examiner* — Chong Wu
(74) *Attorney, Agent, or Firm* — Schwabe, Williamson & Wyatt, P.C.

(57) ABSTRACT

Methods, systems, and storage media for generating and displaying animations of simulated biomechanical motions are disclosed. In embodiments, a computer device may obtain sensor data of a sensor affixed to a user's body or equipment used by the user, and may use inverse kinematics to determine desired positions and orientations of an avatar based on the sensor data. In embodiments, the computer device may adjust or alter the avatar based on the inverse kinematics, and generate an animation for display based on the adjusted avatar. Other embodiments may be disclosed and/or claimed.

25 Claims, 9 Drawing Sheets

(51) Int. Cl.
*G06F 3/01* (2006.01)
*G06T 3/40* (2006.01)
*G06T 7/20* (2017.01)

(52) U.S. Cl.
CPC .............. *G06T 3/4007* (2013.01); *G06T 7/20* (2013.01); *G06T 2215/16* (2013.01)

(56) References Cited

U.S. PATENT DOCUMENTS

2011/0193939 A1* 8/2011 Vassigh .................. G06F 3/011
348/46
2016/0232676 A1* 8/2016 Baek .................. G06K 9/00342

* cited by examiner

ANIMATION SIMULATION OF BIOMECHANICS

CROSS REFERENCE TO RELATED APPLICATIONS

The present application is a national phase entry under 35 U.S.C. § 371 of International Application No. PCT/CN2016/099442, filed Sep. 20, 2016, entitled "ANIMATION SIMULATION OF BIOMECHANICS", which designated, among the various States, the United States of America. The contents of the PCT/CN2016/099442 Application is hereby incorporated by reference in its entirety.

FIELD

The present disclosure relates to the fields of motion capture, and in particular, to apparatuses, methods and storage media for capturing biomechanical motions and animating a simulation based on the captured biomechanical motions.

BACKGROUND

Biomechanics may involve the study and analysis of human movement using through the laws of mechanics. Biomechanics is often employed to gain a better understanding of athletic performance to enhance performance and/or prevent injury.

A first method of observing and analyzing biomechanical motions includes in-person lessons from a coach or other like professional. However, it may be difficult for the coach to observe some biomechanical motions due to motions being performed at high speeds, motions being obfuscated by athlete clothing/uniforms, and/or errors due to human sensory capabilities or perceptions. A second method of observing and analyzing biomechanical motions includes video analysis of a professional biomechanical performance or a student's biomechanical performance. However, analysis of some biomechanical motions may require a frame-by-frame analysis of the video data, which may be difficult using typical video playback devices and/or may require costly video playback devices or systems.

A third method of observing and analyzing biomechanical motions includes capturing motion data from one or more sensors affixed to athletic equipment or on athlete's clothing. One drawback with this method is that it typically requires expensive and complex sensors that are developed for a predefined biomechanical motion (e.g., a specific sport). Another drawback of this method is that it may be difficult to analyze and/or visualize the captured motion data. Historically, the expense and complexity of sensors, and the difficult of analysis, required athletes to visit a motion capture laboratory to use motion capture systems for biomechanical analysis. Currently, biomechanical analysis using motion capture devices has become more viable as the size, costs and complexity of sensor manufacture is reduced. Even with the increased prevalence of motion capture devices, most sensor-based biomechanical analysis systems require the use of motion-specific sensors. Furthermore, many current sensor-based biomechanical analysis systems do not provide sufficient data visualization for proper analysis of biomechanical motions.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
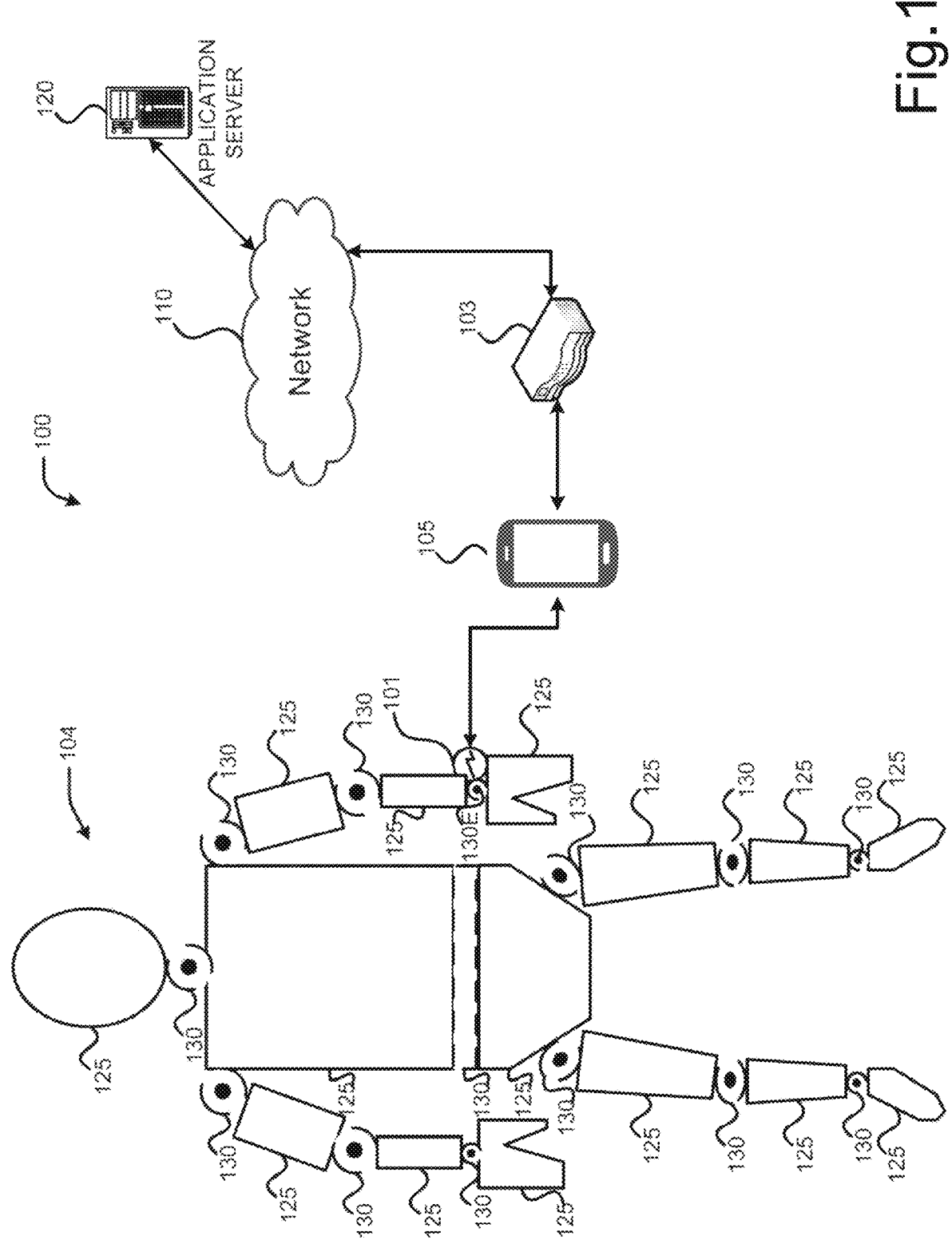
FIG. 1 illustrates an arrangement in which various example embodiments described in the present disclosure may be implemented.

In the following detailed description, reference is made to the accompanying drawings which form a part hereof wherein like numerals designate like parts throughout, and in which is shown by way of illustrated embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed to imply that the various operations are necessarily order-dependent. In particular, these operations might not be performed in the order of presentation. Operations described may be performed in a different order than the described embodiments. Various additional operations might be performed, or described operations might be omitted in additional embodiments.

The description may use the phrases "in an embodiment", "in an implementation", or in "embodiments" or "implementations", which may each refer to one or more of the same or different embodiments. Furthermore, the terms "comprising," "including," "having," and the like, as used with respect to embodiments of the present disclosure, are synonymous.

Also, it is noted that example embodiments may be described as a process depicted with a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in a figure. A process may correspond to a method, a function, a procedure, a subroutine, a subprogram, and the like. When a process corresponds to a function, its termination may correspond to a return of the function to the calling function a main function.

As disclosed herein, the term "memory" may represent one or more hardware devices for storing data, including random access memory (RAM), magnetic RAM, core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

As used herein, the term "circuitry" refers to, is part of, or includes hardware components such as an Application Specific Integrated Circuit (ASIC), an electronic circuit, a logic circuit, a processes (shared, dedicated, or group) and/or memory (shared, dedicated, or group) that are configured to provide the described functionality. In some embodiments, the circuitry may execute computer-executable instructions to provide at least some of the described functionality. The computer-executable instructions may represent program code or code segments, software, logic, firmware, middleware, microcode, procedures, functions, subprograms, routines, subroutines, software package(s), classes, or any combination of instructions, data structures, program statements, and/or functional processes that perform particular tasks or implement particular data types. The computer-readable instructions discussed herein may be implemented using existing hardware in computer devices and communications networks.

As used herein, the term "network element", may be considered synonymous to or referred to as a networked computer, networking hardware, network equipment, router, switch, hub, bridge, gateway, or other like device. The term "network element" may describe a physical computer device of a network with wired or wireless communication links. The term "network element" may describe equipment that provides radio baseband functions for data or voice connectivity between a network and one or more users. The term "channel" as used herein may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated.

Example embodiments are directed to rendering an animated simulation of a user's biomechanical motion using an avatar. Example embodiments provide that a first computer device with one or more seniors may be attached to the user or equipment. The one or more sensors may capture sensor data that is representative of a biomechanical motion of the user. The sensor data may be sent to a second computer device, which may generate and render/play an animation of the avatar performing the biomechanical motion based on the obtained sensor data.

In embodiments, an avatar that is representative of a desired or a template biomechanical motion may be preloaded in the second computer device, and this avatar may be adjusted based on the obtained sensor data. To adjust the avatar, the second computer device may align a spatial domain of the sensor data with a spatial domain of the avatar. The second computer device may also align a curve or path of the sensor data with an avatar curve or track in a temporal domain so that the path of the sensor data and the track of the avatar data have the same time duration and/or the same number of keyframes. The second computer device may apply inverse kinematic technology to a kinematic chain of the avatar, which may provide desired positions and orientations of one or more joints and/or segments of the kinematic chain at individual time instances of a plurality or time instances. Based on the results of the inverse kinematic algorithm, the second computer device may adjust a position and/or an orientation of one or more joints/segments of the avatar's kinematic chain at each individual time instance. The second computer device may then adjust the avatar's tracks according to adjusted avatar joints. The second computer device may animate and display the adjusted avatar tracks using a rendering engine. The animated avatar may be the simulation of the user's biomechanical motion. This process may repeat as the user repeats the biomechanical motion.

The example embodiments are different than current biomechanical analysis systems that utilize sensors or motion capture devices. This is because these current senor-based biomechanical analysis systems do not provide sufficient data visualization for proper analysis of the user's biomechanical motion. For example, most senor-based biomechanical analysis systems may display a curve based on captured sensor data (e.g., a golf swing curve for golf or tennis based systems) but do not typically display an avatar simulating the user's movements as the user performs the biomechanical motion. Some sensor-based biomechanical analysis systems may display an avatar with a user's biomechanical curve. However, these avatars are often "canned" animations that do not substantially match the user's kinematic chain, and do not substantially match the movements of the user.

Referring now to the figures. FIG. 1 shows an arrangement 100 in accordance with various embodiments. As shown in FIG. 1, arrangement 100 may include an environment 108, which may include computer device 101 affixed to a user (not shown by FIG. 1), a gateway (GW) 103, a kinematic chain 104, a computer device 105, network 110, and application server 120. In addition, kinematic chain 104 may include segments 125 and joints 130.

Computer device 101, gateway (GW) 103, and computer device 105 may be capable of communicating using radio frequency (RF) signals. A computer device (such as computer device 105) may be configured to determine, based on obtained sensor data, sensor data points in a sensor spatial domain; determine, from the sensor data points, a path along which the sensor travels in the sensor spatial domain; obtain an avatar including a set of avatar data points along a track in an avatar spatial domain; align the sensor spatial domain with the avatar spatial domain to obtain an aligned spatial domain; synchronize the track with the path such that the track has a same duration as the path; determine, using inverse kinematics, a desired position and orientation (PO) for portions of the avatar; adjust portions of the avatar based on the desired POs; generate an animation of the adjusted avatar based on the synchronization and the aligned spatial domain; and render or play the animation. These and other aspects of the teachings of the present disclosure will be described more fully below.

Computer device 101 may be any device that is embedded with hardware and/or software components that enable the device to measure and/or detect a motion, an acceleration, and/or an orientation of the computer device 101. In embodiments, computer device 101 may include one or more sensors, such as an accelerometer, gyroscope, gravimeter, magnetometer, altimeter, and/or other like sensors. The one or more sensors may be configured so determine a magnitude and direction of a velocity, acceleration, and/or motion of the computer device 101, and convert the velocity, acceleration, and/or motion of the computer device 101 into position and/or orientation information. The changes in the positions and/or orientations of the computer device 101 may be indicative of a biomechanical motion performed by a user of the computer device 101. The one or more sensors may be configured to detect the biomechanical motion as sensor data. In various embodiments, the sensor data may include or otherwise indicate one or more spatial coordinates (or changes in spatial coordinates) for the positions and/or orientations of the computer device 101. The sensor data may then be passed to one or more processors and/or a sensor hub (e.g., sensor hub 255 as shown and described with regard to FIG. 2) of the computer device 101 to be converted into a biomechanical sequence, sensor coordinates, and/or any other type of format of analyzed, processed, or formatted data. In this way, the positions and/or orientations (or changes in the positions and/or orientations) may be used to identify sensor data points in a user spatial domain (also referred to as a "sensor spatial domain"). Furthermore, the computer device 101 may track a timing or the biomechanical motion by timestamping the sensor data as it is collected and/or processed.

Computer device 101 may also include hardware and/or software components that enable the computer device 101 to communicate with one or more other devices (e.g., computer device 105, GW 103, another computer device 101 (not shown), etc.) over a network (e.g., network 110) with little or no user intervention. In this regard, computer device 101 may include a communications circuitry, such as a transmitter/receiver (or alternatively, a transceiver or RF circuitry), one or more memory devices, and one or more processors. To communicate with other devices, the computer device 101 may transmit and receive RF signals according to a wireless communications protocol. The wireless communications protocols may be any suitable set of standardized rules or instructions implemented by the computer device 101 to communicate with other devices. Examples of such wireless communications protocols may include, cellular communications protocols (e.g., Long Term Evolution (LTE), Universal Mobile Telecommunications System (UMTS), Global System for Mobile Communications (GSM) and/or Enhanced Data GSM Environment (EDGE), Wi-MAX or IEEE 802.16 protocols, and the like), Local Area Network (LAN), Wide Area Network (WAN), or wide LAN (WLAN) protocols (e.g., Wi-Fi-based protocols or Institute of Electrical and Electronics Engineers (IEEE) 802.11 protocols), and person-to-person (P2P) or personal are network (PAN) protocols (e.g., IEEE 802.15.4 based protocols including ZigBee, IPv6 over Low power Wireless Personal Area Networks (6LoWPAN), WirelessHART, MiWi, Thread, and the like; WiFi-direct; Bluetooth or Bluetooth Low Energy (BLE) protocols; ANT protocols; Z-Wave; LTE device-to-device (D2D) or Proximity Services (ProSe); Universal Plug and Play (UPnP); and the like). In some embodiments, the computer device 101 may be a computer device that is embedded in a computer system and coupled with communications circuitry of the computer system. In embodiments where the computer device 101 is embedded in a computer system, such the computer device 101 may be a system on chip (SoC) or some other suitable system. The computer system may be a wearable computer device or wearable technology (e.g., a smart watch, fitness or activity tracker), a sensor system embedded in equipment (e.g., inside a baseball bat, golf club, tennis racket, etc.), a telemetry system, or other like computer system.

In embodiments, the computer device 101 may be capable of capturing and/or recording data associated with an event. An event may be any occurrence or an action, such as reaching a velocity or acceleration threshold, a change in direction of a motion, a change in speed/velocity, a state/position/orientation change of the computer device 101, and the like, a temperature change, a change in HR or reaching an HR threshold. In various embodiments, an event may be detected by computer device 101 based on sensor outputs, timer values, user actions, and the like. Once data associated with an event is captured and recorded by the computer device 101, the captured data may be provided to the computer device 105 via a direct wireless connection. In some embodiments, the captured data may be relayed through the GW 103 and/or the network 110 and reported to a service provider (e.g., an operator of the application server 120) for processing and/or analysis.

The computer device 101 may be configured to capture or record sensor data based on a desired event or trigger and report the captured/recorded sensor data based on another event or trigger. For example, in some embodiments, the computer device 101 may begin recording sensor data when the computer device 101 detects a first signal from a button or touchscreen input, and may stop recording sensor data when the computer device 101 has detected a second signal from the button or touchscreen input. In another example, the computer device 101 may begin recording sensor data when the computer device 101 detects that the computer device 101 has reached a velocity threshold and may stop recording sensor data when the computer device 101 has fallen below the velocity threshold. Further, the computer device 101 may report the recorded sensor data once the computer device 101 has fallen below the velocity threshold. In other embodiments, the computer device 101 may report recorded sensor data on a periodic basis. In such embodiments, the computer device 105 may determine or identify portions of the sensor data to be used for biomechanical analysis.

Computer device 105 may be a physical hardware device that is capable of running or executing one or more applications. Computer device 105 may include a transmitter/receiver (or alternatively, a transceiver or RF circuitry), memory, one or more processors, one or more sensors (e.g., accelerometers, gyroscopes, image sensors, Global Positioning System (GPS) receiver, etc.), and/or other like components. Computer device 105 may communicate (transmit/receive) data with computer device 101, and communicate data with application server 120 via network 110 and/or GW 103. Computer device 105 may communicate with the application server 120 via the network 110 and/or GW 103 in accordance with one or more wireless or wired communications protocols as discussed herein. Computer device 105 may communicate with computer device 101 in accordance with one or more wireless communications protocols as discussed herein. Computer device 105 may be configured to run, execute, or otherwise operate one or more applications for generating simulations of biomechanical motions, which may include for example, operating the biomechanical feedback generation/display processes of the example embodiments (e.g., process 800 as shown and described with regard to FIG. 8). These applications may be native applications, web applications, and/or hybrid applications. Computer device 105 may be a wireless cellular phone, a smartphone, a laptop personal computer (PCs), a tablet PC, a handheld messaging device, a personal data assistant, an electronic book reader, an augmented reality head-mounted (or helmet-mounted) display device, and/or any other physical or logical device capable of recording, storing, and/or transferring digital data. As such, the computer device 105 may be capable of establishing a radio link with the computer device 101 according to one or more of the previously mentioned wireless communications protocols to obtain sensor data captured by the computer device 101.

GW 103 may be a network element that employs multi-radio frequency networks technology, and may provide network connectivity for the computer device 105 and/or the computer device 101. In this regard, the GW 103 may also communicate data to/from the application server 120 via the network 110 on behalf of the Computer device 101 and/or computer device 105. Further, GW 103 may act as a single point of contact between devices that are unable to directly connect to larger networks (e.g., network 110) and remote computer devices. In such embodiments, GW 103 may be a wireless access point (WAP), a home server coupled with RF communications logic, a smallcell base station (e.g., a femtocell, picocell, home evolved nodeB (HeNB), and the like), a router, a switch, a hub, a radio beacon, and/or any other like device that may provide network connectivity to the elements in arrangement 100. In some embodiments, the GW 103 may be communicatively coupled with a WAP through a wired or wireless connection. The GW 103 may include one or more processors, communications circuitry (e.g., including a network interface, one or more transmitters/receivers connected to one or more antennas, and the like), and computer readable media. The one or more transmitters/receivers (or transceivers) may be configured to wirelessly transmit/receive RF signals to/from computer device 101 and/or computer device 105, and the network interface may be configured to transmit/receive data to/from application server 120 via network 110 using a wired connection. The GW 103 may process and/or route data packets over the wired connection according to one or more communications protocols, such as Ethernet (e.g., IEEE 802.1, 802.2, and 802.3 protocols); Point-to-Point Protocol (PPP) over Ethernet (PPPoE); PPP over asynchronous transfer mode (ATM (PPPoA); High Level Data Link Control (HDLC); and/or any other like protocols. In embodiments where multiple computer devices 101 are employed (e.g., when a user uses multiple wearable devices, when an environment includes multiple users using one or more wearable devices, etc.), GW 103 may provide communication services to computer device 105 and/or computer device 101 by coordinating communications between the multiple computer devices 101 and the computer device 105. In this regard, the GW 103 may act as a centralized hub and/or scheduler for the various devices. In some embodiments, the GW 103 may be a standalone device that is specifically manufactured to provide computer device 101 and/or computer device 105 with connectivity to network 110, such as an Internet of Things (IoT) GW, an automation hub, or sosome other suitable device. In this regard, GW 103 may be used in deployment scenarios where multiple computer devices 101 are employed, such as a gym or training center with multiple users and/or computer devices 101/105.

Network 110 may be any network that allows computers to exchange data. Network 110 may include one or more network elements (not shown) capable of physically or logically connecting computers. The network 110 may include any appropriate network, including an intranet, the Internet, a cellular network, a local area network (LAN), a personal network or any other such network or combination thereof. Components used for such a system can depend at least in part upon the type of network and/or environment selected. Protocols and components for communicating via such a network are well known and will not be discussed herein in detail. Communication over the network may be enabled by wired or wireless connections, and combinations thereof.

In embodiments, application server 120 may include one or more systems and/or applications for providing one or more services to one or more clients (e.g., computer device 105). Application server 120 may include one or more processors, memory or computer readable storage media, a network interface, and/or other like components. Additionally, application server 120 may be a single physical hardware device, or may be physically or logically connected with other network devices and/or data storage devices, so as to reside on one or more physical hardware devices. Application server 120 may be connected to, or otherwise associated with one or more data storage devices (not shown). The application server 120 may be any device capable of receiving and responding to requests from one or more client devices (e.g., computer device 105 or computer device 101) across a computer network (e.g., network 110) to provide one or more services. The application server 120 may include an operating system that may provide executable program instructions for the general administration and operation of application server 120, and may include a computer-readable medium storing instructions that, when executed by a processor or the application server 120, may allow the application server 120 to perform its intended functions. Suitable implementations for the operating system and general functionality of the servers are known or commercially available, and are readily implemented by persons having ordinary skill in the art, particularly in light of the disclosure herein. Furthermore, it should be understood that the application server 120 may not be required and the applications and software components discussed herein may be executed on any appropriate device or host machine.

In some embodiments, the application server 120 may provide IoT device services that may utilize information obtained/recorded by the computer device 101. For example, in some embodiments the application server 120 may perform the biomechanical feedback generation/display processes of the example embodiments. In other embodiments, the computer device 105 may perform the biomechanical feedback generation/display processes of the example embodiments, and the application server 120 may provide additional or supplementary services, such as athletic performance analytics and analysis based on the biomechanical simulation generated by the computer device 105. The application server 120 may obtain sensor data from the computer device 101 or simulation/animation data from the computer device 105, analyze such data, and may be able to generate content such as text, graphics, audio and/or video to be transferred to computer device 105, via a web server (not shown) in the form of HTML, XML, ASP, MPEG-DASH, Java™, JSP, PHP, and/or any other appropriate structured language or server-side scripting language. The handling of requests and responses, (e.g., requests for information/content and the information/content provided in response) may be handled by the web server (not shown).

Kinematic chain 104 may be a collection or assembly of segments 125 connected by joints 130 that is used as a representation of a mechanical or biomechanical system. In embodiments, the kinematic chain 104 may be a representation of a user of a system including at least the computer device 101 and the computer device 105. The kinematic chain 104 may be organized as a hierarchical tree structure that is used as a skeleton or template for an avatar. The avatar may be used for a standard or template animation that includes all stages of a particular biomechanical motion, and which may be adjusted to fit the user of the computer device 101. In embodiments, the animation may be represented by keyframes, whose each keyframe describes the scale, rotation, and transmission variants of every joint 130 in a coordinate system. A rendering engine (e.g., rendering engine 355 shown and described with regard to FIGS. 3-4) may play the animation with Forward Kinematics (FK) and render/display the animation on a display device (e.g., display device 440 shown and described with regard to FIG. 4).

In embodiments, the kinematic chain 104 may include a plurality of joints 130. The number of joints 130 that are included in the kinematic chain 104 may be implementation specific and/or specific to a particular biomechanical motion to be modeled. In some embodiments, the kinematic chain 104 may include 80 joints 130, which may include representations of major joints and fine joints. Major joints may include head joints, neck joints, pelvis joints, shoulder joints, elbow joints, wrist joints, hip joints, knee joints, ankle joints, and the like. Fine joints may include individual hand joints, individual finger joints, individual foot joints, individual toe joints, individual spinal vertebrae joints, and the like. Furthermore, a position and/or orientation (PO) of each segment 125 may be based on their connection to other segments 125 such that the PO of each segment 125 may be altered or adjusted based on a movement or repositioning of another segment 125 and/or a joint 130.

Based on the constraints of the kinematic chain 104, example embodiments may utilize inverse kinematics to determine the PO of each segment 125 and/or each joint 130 to obtain a desired configuration or pose of the kinematic chain 104. Inverse kinematics refers to the use of the kinematics equations, which define the configuration of the kinematic chain 104 in terms of its joint parameters, to determine the joint parameters of the desired configuration or pose of the kinematic chain 10. In some embodiments, the desired configuration or pose of the kinematic chain 101 may be based on the an angle of a first segment 125 with respect to a second segment 125 or an angle of a joint 130 between the first segment 125 and the second segment 125. Furthermore, the desired configuration or pose of the kinematic chain 104 may be based on an end-effector of the kinematic chain 104. Typically, an end-effector may be a portion of a kinematic chain that interacts with an environment outside of or separate from the kinematic chain. For example, in the field of robotics, an end-effector of a robotic kinematic chain may be a portion of the robot that has an attached tool, such as jaws, claws, pin for piercing, magnet, vacuum, and the like. In various embodiments, the end-effector of kinematic chain 104 may be a portion of the kinematic chain 104 that corresponds to a portion of the user to which the computer device 101 is attached. In the example shown by FIG. 1, the computer device 101 may be attached to the wrist of the user. Accordingly, in the example shown by FIG. 1, the end-effector may be joint 130E (e.g., representative of the user's wrist). In some embodiments, the end-effector may also include one or more segments 125 adjacent to or associated with the computer device 101. For instance, in the example shown by FIG. 1, a segment 125 representative of the user's forearm and/or a segment 125 representative of the user's hand may be included as the end-effector. The placement of the computer device 101 and/or the selection of the end-effector may be implementation specific, based on the specific biomechanical motion(s) to be performed and/or analyzed, and/or based on any other criteria.

In FIG. 1, only one computer device 101, one GW 103, one computer device 105, and a single application server 120 are shown. According to various embodiments, any number of wearable devices or sensors, any number of GWs, any number of client devices, any number of servers, and/or any number of databases (not shown) may be present. Additionally, in some embodiments, application server 120 and/or one or more associated databases (not shown) may be virtual machines, and/or they may be provided as part of a cloud computing service. In various embodiments, application server 120 and one or more databases may reside on one physical hardware device, and/or may be otherwise fully integrated with one another. Thus, the depiction of the illustrative arrangement 100 in FIG. 1 should be taken as being illustrative in nature, and not limited in the scope of the disclosure.

Figure 2:
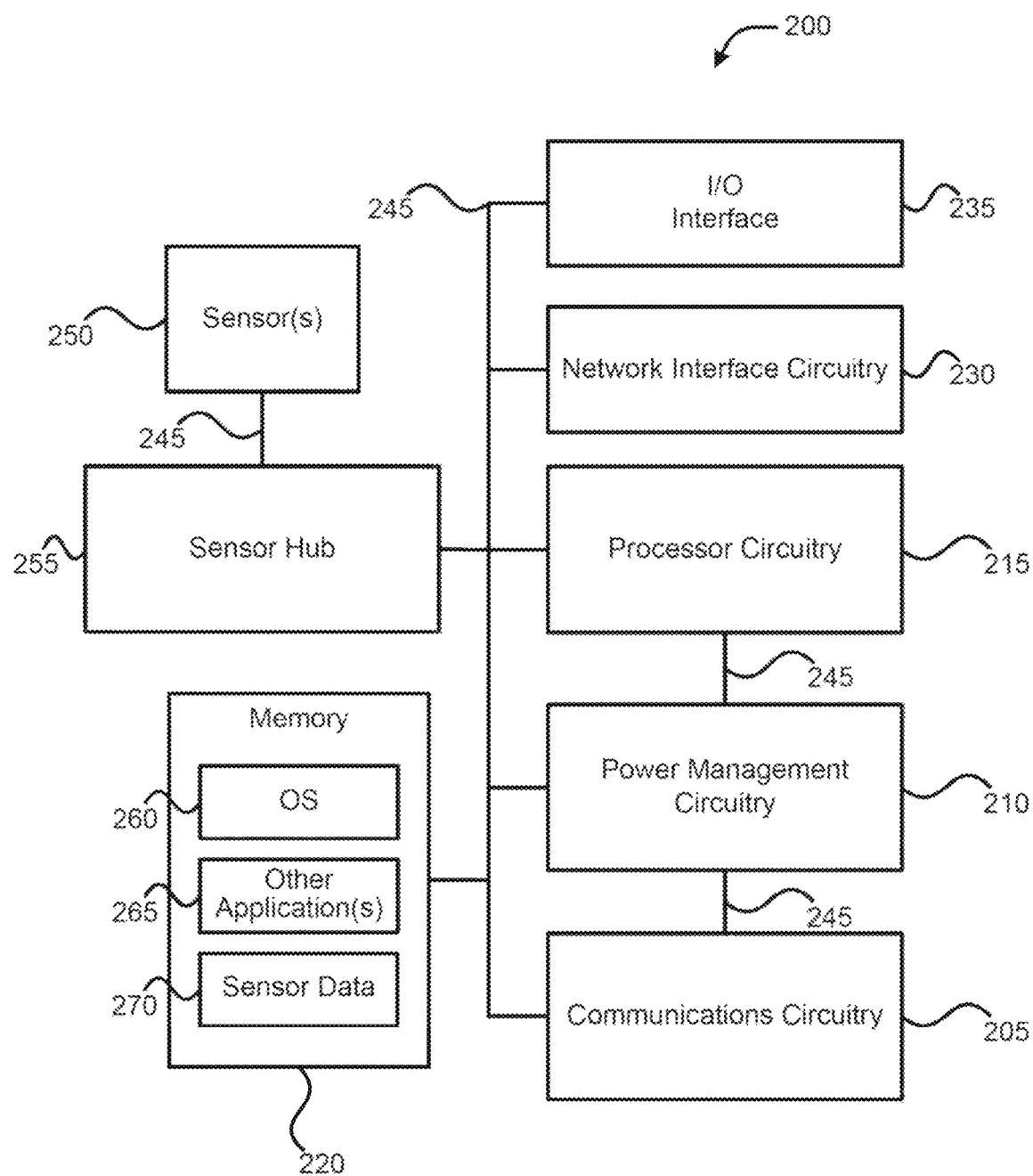
FIG. 2 illustrates the components of another computer device in accordance with various example embodiments.

FIG. 2 illustrates the components of a computer device 200, in accordance with various example embodiments. In embodiments, computer device 200 may comprise communications circuitry 205, power management circuitry (PMC) 210, processor circuitry 215, memory 220 (also referred to as "computer-readable media 220" or "CRM 220"), network interface circuitry (NIC) 230, input/output (I/O) interface 235 one or more sensors 250 (also referred to as "sensor(s) 250"), and sensor hub 255, coupled with each other in bus 245 at least as shown by FIG. 2. In various embodiments, computer device 200 may correspond to computer device 101.

CRM 220 may be a hardware device configured to store an operating system 260 and program code for one or more software components, such as sensor data 270 and/or one or more other application(s) 265. CRM 220 may be a computer readable storage medium that may generally include a volatile memory (e.g., random access memory (RAM), synchronous dynamic RAM (SDRAM) devices, double-data rate synchronous dynamic RAM (DDR SDRAM) device, flash memory, and the like), non-volatile memory (e.g., read only memory (ROM), solid state storage (SSS), non-volatile RAM (NVRAM), and the like), and/or other like storage media capable of storing and recording data. Instructions, program code and/or software components may be loaded into CRM 220 by one or more network elements via network 110 and communications circuitry 205 using over-the-air (OTA) interfaces or via NIC 230 using wired communications interfaces (e.g., from application server 120, a remote provisioning service, etc.). In some embodiments, software components may be loaded into CRM 220 during manufacture of the computer device 200.

During operation, memory 220 may include operating system 260, sensor data 270, and other application(s) 265. Operating system 260 may manage computer hardware and software resources and provide common services for computer programs. Operating system 260 may include one or more drivers or application programming interfaces (APIs) that provide an interface to hardware devices thereby enabling operating system 260 and other application(s) 265 to access hardware functions without needing to know the details of the hardware itself. The operating system 260 may be a general purpose operating system or an operating system specifically written for and tailored to the computer device 200. Sensor data 270 may be a collection of data based on measurements obtained by the one or more sensors 250 and processed by sensor hub 255. Other application(s)

265 may be a collection of logic and/or program code that enables the computer device 200 to perform various function of the computer device 200.

Processor circuitry 215 may be configured to carry out instructions of a computer program by performing the basic arithmetical, logical, and input/output operations of the system. The processor circuitry 215 may include one or more processors (e.g., a single-core processor, a dual-core processor, a triple-core processor, a quad-core processor, etc.), one or more microcontrollers, one or more digital signal processors (DSPs), and the like. In embodiments, the processor circuitry 215 may include feature-matching capabilities that allows the processor circuitry 215 to recognize patterns of incoming sensor data 270 from the sensor hub 255. In addition, the processor circuitry 215 may be capable of controlling the storage of sensor data 270 in memory 220. The processor circuitry 215 may perform the aforementioned functions and a variety of other functions for the compute device 200 and may process data by executing program code, logic or software modules, firmware, middleware, microcode, hardware description languages, and/or any other like set of instructions stored in the memory 220. The program code may be provided to processor circuitry 215 by memory 220 via bus 245 and/or via communications circuitry 205. In order to perform the variety of functions and data processing operations, the program code and/or software components may be executed by the processor circuitry 215. On execution by the processor circuitry 215, the processor circuitry 215 may cause computer device 200 to perform the various operations and functions delineated in the program code.

Sensor(s) 250 may be any device or devices that are capable of converting a mechanical motion into an electrical signal, such as microelectromechanical systems (MEMS) with piezoelectric, piezoresistive and/or capacitive components, which may be used to determine environmental conditions or location information related to the computer device 200. In some embodiments, the sensors may include, but are not limited to, one or more gyroscopes, accelerometers, gravimeters, compass/magnetometers, altimeters, barometers, proximity sensors (e.g., infrared radiation detector and the like), ambient light sensors, thermal sensors, ultrasonic transceivers, and/or positioning circuitry. The positioning circuitry may also be part of, or interact with, the communications circuitry 205 to communicate with components of a positioning network, such a Global Navigation Satellite System (GNSS) or a Global Positioning System (GPS).

Sensor hub 255 may act as a coprocessor for processor circuitry 215 by processing data obtained from the sensor(s) 250. The sensor hub 255 may include one or more processors (e.g., a single-core processor, a dual-core processor, a triple-core processor, a quad-core processor, etc.), one or more microcontrollers, one or more digital signal processors (DSPs), and/or other like devices. Sensor hub 255 may be configured to integrate data obtained from each of the sensor(s) 250 by performing arithmetical, logical, and input/output operations. In embodiments, the sensor hub 255 may capable of timestamping obtained sensor data, provide sensor data to the processor circuitry 215 in response to a query for such data, buffering sensor data, continuously streaming sensor data to the processor circuitry 215 including independent streams for each sensor 250, reporting sensor data based upon predefined thresholds or conditions/triggers, and/or other like data processing functions.

PMC 210 may be integrated circuit (e.g., a power management integrated circuit (PMIC)) or a system block in a system on chip (SoC) used for managing power requirements of the computer device 200. The power management functions may include power conversion (e.g., alternating current (AC) to direct current (DC), DC to DC, etc.), battery charging, voltage scaling, and the like. PMC 210 may also communicate battery information to the processor circuitry 215 when queried. The battery information may indicate whether the computer device 200 is connected to a power source, whether the connected power sources is wired or wireless, whether the connected power sources is an alternating current charger or a USB charge, a current voltage of the battery, a remaining battery capacity as an integer percentage of total capacity (with or without a fractional part), a battery capacity in microampere-hours, an average battery current in microamperes, an instantaneous battery current in microamperes, a remaining energy in nanowatt-hours, whether the battery is overheated, cold, dead, or has an unspecified failure, and the like. PMC 210 may be communicatively coupled with a battery or other power source of the computer device 200 (e.g., nickel-cadmium (NiCd) cells, nickel-zinc (NiZn) cells, nickel metal hydride (NiMH) cells, and lithium-ion (Li-ion) cells, a supercapacitor device, an ultracapacitor device, a fuel cell device, etc.).

NIC 230 may be a computer hardware component that connects computer device 200 to a computer network, for example, network 135, via a wired connection. To this end, NIC 230 may include one or more dedicated processors and/or FPGAs to communicate using one or more wired communications protocol. The wired communications protocols may include a serial communications protocol (e.g., the Universal Serial Bus (USB), FireWire, Serial Digital Interface (SDI), and/or other like serial communications protocols), a parallel communications protocol (e.g., IEEE 1284, Computer Automated Measurement And Control (CAMAC), and/or other like parallel communications protocol), and/or a network communications protocol (e.g., Ethernet, token ring, Fiber Distributed Data Interface (FDDI), and/or other like network communications protocols). The NIC 230 may also include one or more virtual network interfaces configured to operate with the one or more applications contained of the computer device 200.

I/O interface 235 may be a computer hardware component that provides communication between the computer device 200 and one or more other devices. The I/O interface 235 may include one or more user interfaces designed to enable user interaction with the computer device 200 and/or peripheral component interfaces designed to provide interaction between the computer device 200 and one or more peripheral components. User interfaces may include, but are not limited to a physical keyboard or keypad, a touchpad, a speaker, a microphone, etc. Peripheral component interfaces may include, but are not limited to, a non-volatile memory port, an audio jack, a power supply interface, a serial communications protocol (e.g., Universal Serial Bus (USB), FireWire, Serial Digital Interface (SDI), and/or other like serial communications protocols), a parallel communications protocol (e.g., IEEE 1284, Computer Automated Measurement And Control (CAMAC), and/or other like parallel communications protocols), etc.

Bus 245 may be configured to enable the communication and data transfer between processor circuitry 215 and memory 220. Bus 245 may comprise a high-speed serial bus, parallel bus, internal universal serial bus (USB), Front-Side-Bus (FSB), a PCI bus, a PCI-Express (PCI-e) bus, a Small Computer System Interface (SCSI) bus, an SCSI parallel interface (SPI) bus, an Inter-Integrated Circuit (I2C) bus, a universal asynchronous receiver/transmitter (UART) bus, and/or any other suitable communication technology for transferring data between components within computer device 200.

Communications circuitry 205 may include circuitry for communicating with a wireless network and/or cellular network, such as baseband circuitry and radio frequency (RF) circuitry. The baseband circuitry may include one or more single-core or multi-core processors that are dedicated to a particular wireless communication protocol. For example, the baseband circuitry may include one or more baseband processors for communicating in accordance with Global GSM and/or EDGE protocols; one or more baseband processors for communicating in accordance with UMTS and/or LTE/LTE-A protocols (including dedicated baseband processors for second generation (2G), third generation (3G), fourth generation (4G), 5G, etc.); one or more baseband processors for communicating in accordance with EVDO protocols, one or more baseband processors for communicating in accordance with Wi-Fi and/or IEEE 802.11 protocols; one or more baseband processors for communicating in accordance with IEEE 802.15.4-802.15.5 protocols including ZigBee, WirelessHART, 6LoWPAN, etc.; one or more baseband processors for communicating in accordance with WiMAX protocols; one or more baseband processors for communicating in accordance with Bluetooth or BLE protocols, and/or one or more baseband processors for communicating in accordance with any other wireless communication protocols, including RF-based, optical, and so forth. The one or more of baseband processors may handle various radio control functions that enable communication with one or more radio networks via the communications circuitry 205. The radio control functions may include, but are not limited to, signal modulation, encoding, decoding, radio frequency shifting, etc. In various embodiments, baseband circuitry may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry may enable communication with wireless networks using modulated electromagnetic radiation through a non-solid medium. In various embodiments, the RF circuitry may include switches, filters, amplifiers, etc. to facilitate the communication with one or more wireless networks. The RF circuitry may be coupled with one or more antenna elements (e.g., antenna element 409 shown by FIG. 4) to enable communication with one or more other devices. RF circuitry, as controlled by the baseband circuitry, may generate or otherwise produce radio waves to transmit data to one or more other devices via the one or more antenna elements. The RF circuitry may be configured to receive and convert a signal from a modulated radio wave into usable information, such as digital data, which may be provided to one or in more other components of computer device 200 via bus 245. In various embodiments, RF circuitry may include circuitry to operate with signals that are not strictly considered as being in a radio frequency. For example, in some embodiments, RF circuitry may include circuitry to operate with signals having an intermediate frequency, which is between a baseband frequency and radio frequency. Furthermore, the RF circuitry may be equipped with multiple radios operating in different spectrum bands.

The components of computer device 200 may be implemented using any suitably configured hardware and/or software. For example, in some embodiments the components of computer device 200 may be packaged together to form a single package or SoC. For example, in some embodiments the PMC 210, processor circuitry 215, memory 220, and sensor hub 255 may be included in an SoC that is communicatively coupled with the other components of the computer device 200. Additionally, although FIG. 2 illustrates various components of the computer device 200, in some embodiments, computer device 200 may include many more components than those shown in FIG. 2, however, it is not necessary to show and describe such components to illustrate the example embodiments.

Figure 3:
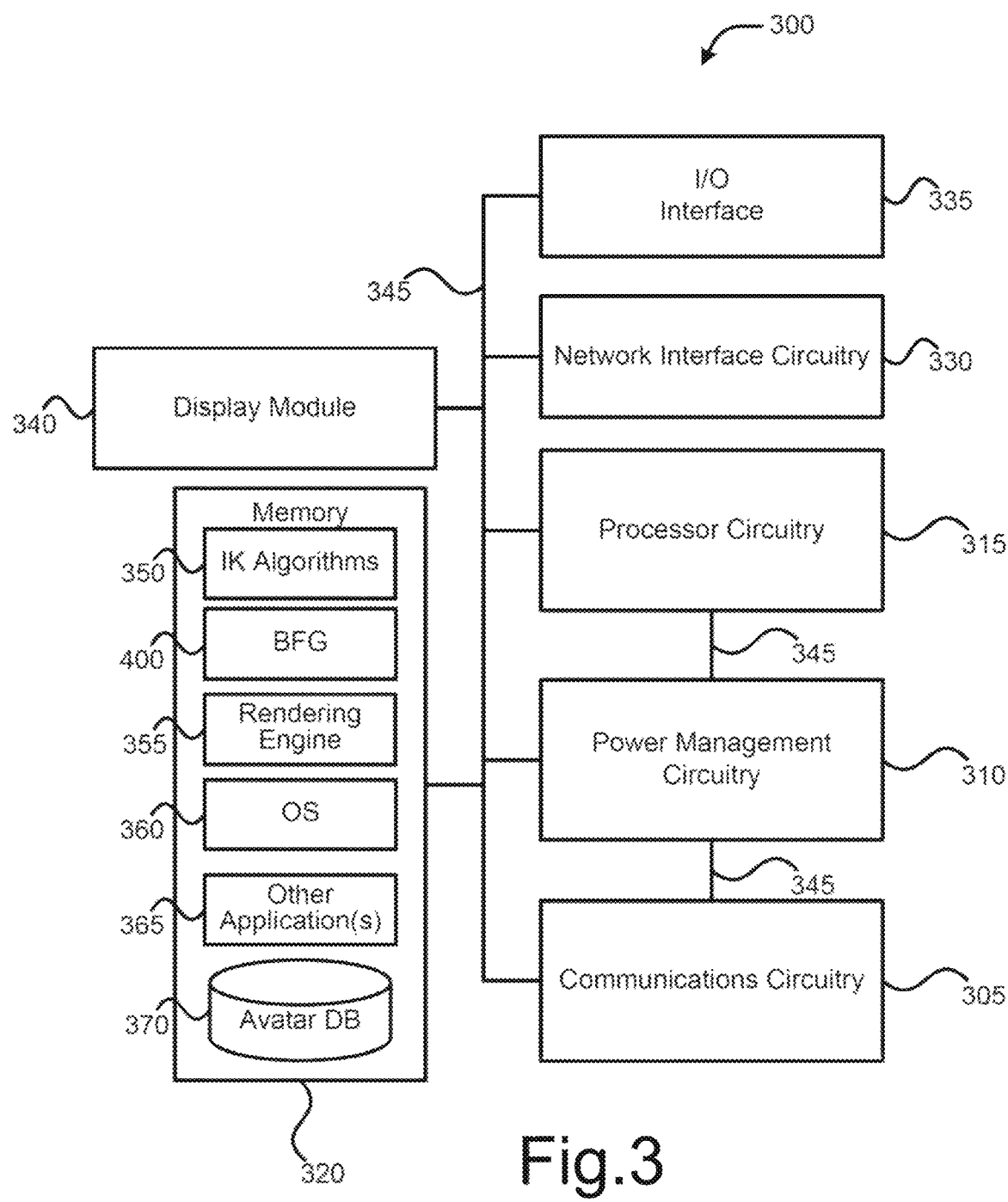
FIG. 3 illustrates the components of another computer device in accordance with various example embodiments.

FIG. 3 illustrates the components of a computer device 300, in accordance with various example embodiments. In embodiments, computer device 300 may comprise communications circuitry 305, PMC 310, processor circuitry 315, memory 320 (also referred to as "computer readable media 320" or "CRM 320"), NIC 330, and I/O interface 335, display module 340 coupled with each other by bus 345 at least as shown by FIG. 3. In various embodiments, computer device 300 may correspond to computer device 105, GW 103, or application server 120. In embodiments, the components of computer device 300 may be the same or similar to the components of computer device 200 discussed previously. For example, communications circuitry 305 may be the same or similar as communications circuitry 205, PMC 310 may be the same or similar as PMC 210, processor circuitry 315 may be the same or similar as processor circuitry 215, CRM 320 may be the same or similar as CRM 220, NIC 330 may be the same or similar as NIC 220, I/O interface 335 may be the same or similar as I/O interface 235, and bus 345 may be the same or similar as bus 245. For the sake of brevity, only the differences between the components of computer device 300 and the components of computer device 200 will be discussed infra.

CRM 320 may be the same or similar to CRM 220, but may be store an operating system 360 and program code for one or more software components, such as inverse kinematic (IK) algorithms 350, biomechanical feedback generator (BFG) 400, rendering engine 355, and/or other application(s) 365. CRM 320 may also store one or more avatars in an avatar database (DB) 370. Instructions, program code and/or software components may be loaded into CRM 320 by one or more network elements via network 110 and communications circuitry 305 using OTA interfaces and/or via NIC 330 using wired communications interfaces (e.g., from application server 120, a remote biomechanical analytics service, etc.). In some embodiments, software components may be loaded into CRM 320 during manufacture of the computer device 300. In some embodiments, the program code and/or software components may be loaded from a separate computer readable storage medium into memory 320 using a drive mechanism (not shown), such as a memory card, memory stick, removable flash drive, sim card, a secure digital (SD) card, and/or other like computer readable storage medium (not shown).

Operating system 360 may manage computer hardware and software resources and provide common services for computer programs, and may include one or more drivers that provide an interface to hardware devices for operating system 360, rendering engine 355, BFG 400, rendering engine 355, and other application(s) 365 to access hardware functions without needing to know the details of the hardware itself. The operating system 360 may be a general purpose operating system or an operating system specifically written for and tailored to the computer device 300. BFG 400 may be a collection of software logics and/or program code that enables the computer device 300 to operate according to the various example embodiments as discussed with regard to FIGS. 4-8. Other application(s) 365 may be a collection of logic and/or program code that enables the computer device 300 to perform various function of the computer device 300.

Processor circuitry 315 may be configured to carry out instructions of a computer program by performing the basic arithmetical, logical, and input/output operations of the system. The processor circuitry 315 may include a single-core processor, a dual-core processor, a triple-core processor, a quad-core processor, DSPs, one or more graphics processing units (GPUs), etc. The program code may be provided to processor circuitry 315 by memory 320 via bus 345, one or more drive mechanisms (not shown), via NIC 330, and/or via communications circuitry 305. In order to perform the variety of functions and data processing operations, the program code and/or software components may be executed by the processor circuitry 315. On execution by the processor circuitry 315, the processor circuitry 315 may cause computer device 300 to perform the various operations and functions delineated by the program code.

For example, the BFG 400 may include logic or modules configured to operate (through hardware and/or software) to perform functions in accordance with the example embodiments described herein. The various logic/modules of the BFG 400 may be loaded into the memory 320. The logic/modules of BFG 400 may include an analyzer 405 and avatar engine 410 (as discussed with regard to FIG. 4). Once the various logic/modules of the BFG 400 are loaded into memory 320 and executed by one or more processors of the processor circuitry 315, the one or more processors may be configured to cause computer device 300 to obtain sensor data from, for example computer device 200 via communications circuitry 305; identify sensor data points in a sensor spatial domain based on the sensor data; determine, from the sensor data points, a path along which the sensor travels in the sensor spatial domain; obtain an avatar, wherein the avatar includes a set of avatar data points along a track in an avatar spatial domain; align the sensor spatial domain with the avatar spatial domain to obtain an aligned spatial domain; and align a temporal domain of the track with a temporal domain of the path such that the avatar data points along the track occur at a same time as the sensor data points along the path. Furthermore, logic/modules of the rendering engine 355 may be loaded into memory 320 and executed by processor(s) of the processor circuitry 315, which may cause the computer device 300 to generate an animation of the avatar based on the aligned spatial domain and the aligned temporal domain; and provide the animation to display module 340 for display. While specific logic/modules are described herein, it should be recognized that, in various embodiments, various logic/modules may be combined, separated into separate logic/modules, and/or omitted. Additionally, in various embodiments, one or more logic/modules may be implemented on separate devices, in separate locations, or distributed, individually or in sets, across multiple processors, devices locations, and/or in cloud-computing implementations.

Figure 4:
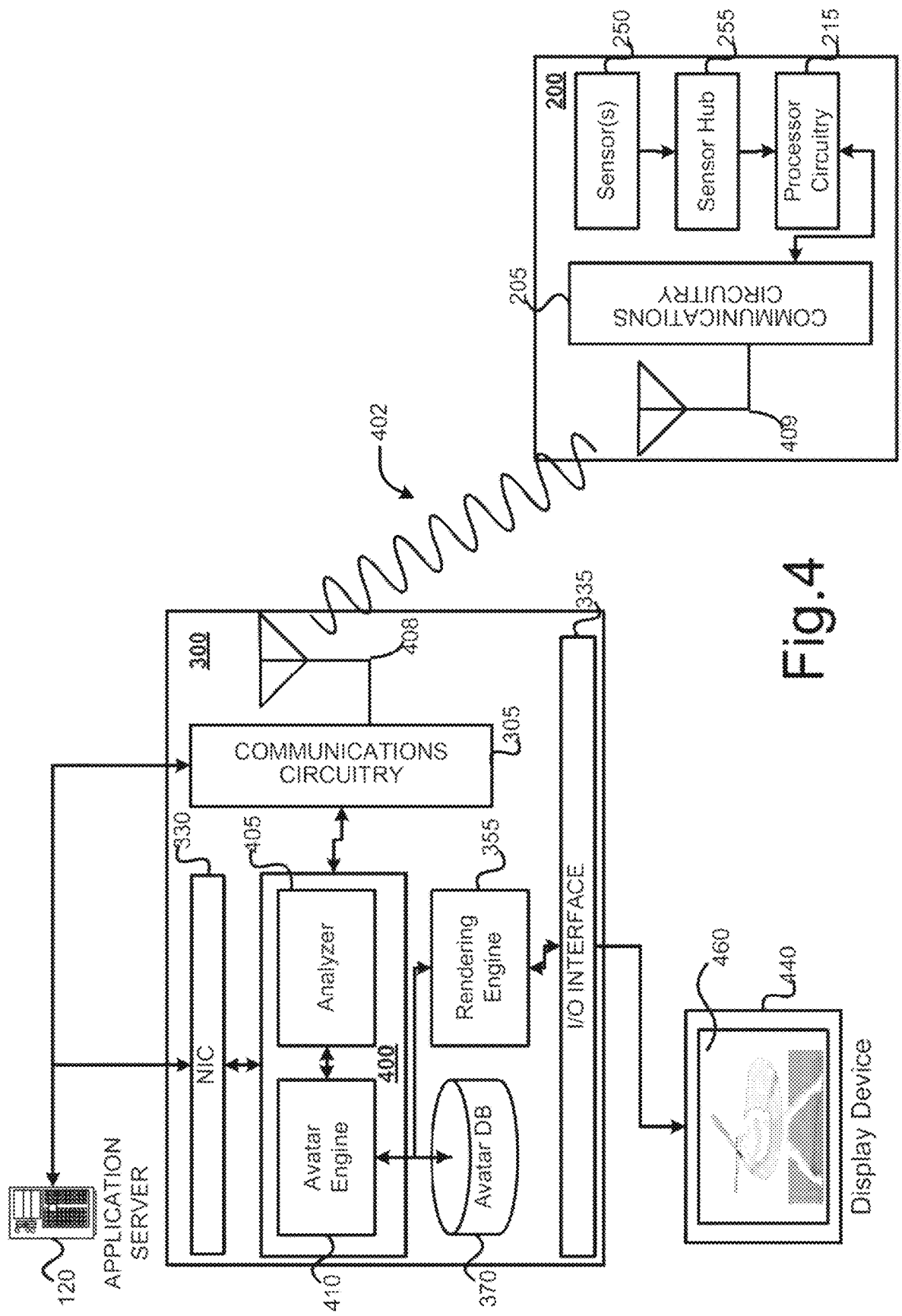
FIG. 4 illustrates example embodiments of logical components and interaction points between elements shown and described with regard to FIGS. 1-3.

Display module 340 may be configured to provide generated animations and/or data stream segments for display on a display device (e.g., display device 440 shown and described with regard to FIG. 4). Additionally, the display module 340 may be one or more software modules/logic that operate in conjunction with one or more hardware devices to provide data stream segments to the display device via the I/O interface 335. In various embodiments, the display device may be a liquid crystal display, a touch screen display, and the like. The display module 340 may operate in accordance with one or more known display protocols, such as video graphics array (VGA) protocol, the digital visual interface (DVI) protocol, the high-definition multimedia interface (HDMI) specifications, the display pixel interface (DPI) protocol, and/or any other like standard that may define the criteria for transferring audio and/or video data to a display device. Furthermore, the display module 340 may operate in accordance with one or more remote display protocols, such as the wireless gigabit alliance (WiGiG) protocol, the remote desktop protocol (RDP), PC-over-IP (PCoIP) protocol, the high-definition experience (HDX) protocol, and/or other like remote display protocols. In such embodiments, the display module 340 may provide data stream segments to the display device via the NIC 330 rather than the I/O interface 335.

The components of computer device 300 may be implemented using any suitably configured hardware and/or software. For example, in some embodiments the components of computer device 300 may be packaged together to form a single package or SoC. Additionally, although FIG. 3 illustrates various components of the computer device 300, in some embodiments, computer device 300 may include many more components than those shown in FIG. 3, however, it is not necessary to show and describe such components to illustrate the example embodiments.

FIG. 4 shows example logical components and interaction points between components/logic of BFG 400, components of the computer devices 200 and 300, and/or elements of arrangement 100 according to various embodiments. The BFG 400 may include analyzer 405 and avatar engine 410. The elements shown by FIG. 4 may operate as follows.

First, computer device 300 may communicatively couple with the computer device 200. In this regard, communications circuitry 305 may use antenna element 408 to establish radio link 402 with the communications circuitry 205 via antenna element 409. The radio link 402 (also referred to as "channel 402") may be established in accordance with one or more wireless protocols discussed previously. As a user of the computer device 200 performs a biomechanical motion, the sensor(s) 250 may capture and record sensor data 270, which may be passed to sensor hub 255 for processing. The sensor hub 255 may pass the processed sensor data to processor circuitry 215, which may then be passed to communications circuitry 205. Communications circuitry 205 may perform various radio control functions to communicate the sensor data to computer device 300 over radio link 402. In some embodiments, the sensor data 270 may be stored or buffered in memory 220 prior to, or after being communicated to computer device 300 (not shown by FIG. 4). In some embodiments, the processor circuitry 215 may instruct or control the communications circuitry 205 to transmit the sensor data on a periodic basis, or based on whether certain triggers/conditions/thresholds have been met. Once received by communications circuitry 305, the sensor data 270 may be passed to the analyzer 405 of BFG 400.

Analyzer 405 may determine or identify sensor data points from the sensor data 270 in a spatial domain of the sensor (also referred to as a "sensor spatial domain"). The analyzer 405 may also determine a path along which the sensor travels in the sensor spatial domain based on the sensor data points. An example of a sensor spatial domain is shown and described with regard to FIG. 5. The analyzed/processed sensor data 405 may then be passed to the avatar engine 410.

The avatar engine 410 may obtain an avatar from the avatar DB 370. In some embodiments, the avatar may have been preloaded into the avatar DB 370. In such embodiments, the avatar may have been received from the application server 120 via the NIC 330 and BFG 400. The preloaded avatar may be a template for a specific/desired biomechanical motion. The (template) avatar may include one or more sets avatar data points, wherein each set of avatar data points may travel along a corresponding track in a spatial domain of the avatar (also referred to as "an avatar spatial domain"). In addition, the avatar may comprise the kinematic chain 104 (see e.g., FIG. 1), and as discussed previously, the kinematic chain 104 may include a plurality of segments 125, joints 130, and an end-effector 130E. Each segment 125 (also, referred to as an "avatar segment 125") of the plurality of segments 125 may be associated with a corresponding set of avatar data points that move along a corresponding track. The set of avatar data points of the end-effector 130E may be referred to as an "end-effector set of avatar data points" or an "end-effector set," and the track that the end-effector set travels along may be referred to as an "end-effector track."

In embodiments, the avatar engine 410 may align the sensor spatial domain with the avatar spatial domain to obtain an aligned spatial domain. In some cases, the sensor spatial domain and avatar spatial domain may have their own measurement units and coordinate systems. In such cases, in order to have the avatar stimulate the biomechanical motion of a user of the computer device 200, the avatar engine 410 may align the coordinate systems and normalize the sensor data in the sensor spatial domain to the avatar data points in the avatar spatial domain such that they have direct mapping. Normalization may be used to reduce errors in the sensor data 270 by, for example increasing a sampling rate, using anti-aliasing filters, and/or other like normalization techniques. In some embodiments, normalizing the sensor data for alignment of the spatial domains may include adding or discarding data points so that each avatar data point of the avatar data points corresponds to a sensor data point of the sensor data points. In some embodiments, one or more sensor data points may be eliminated or discarded so that there is a directed one-to-one mapping between the sensor data points and the avatar data points. In order embodiments, one or more additional or new avatar data points may be extrapolated or derived from the sensor data points in order to provide the one-to-one mapping between sensor data points and avatar data points. For example, in embodiments, the avatar engine 410 may generate new avatar data points until a sum of the number of new avatar data points and the number of avatar data points is equal to the number of sensor data points.

Once the spatial domains are aligned, the avatar engine 410 may align the temporal domains of the avatar spatial domain with the sensor spatial domain. This may include synchronizing the track of the sensor data points with the path of the avatar data points such that the track has a same durations as the path. Furthermore, with the spatial and temporal domains aligned, the avatar engine 410 may determine POs for the various joints 130 and/or segments 125 (also referred to as "avatar segments"), which are shown by FIG. 1, for example. In embodiments, the avatar engine 410 may apply IK algorithms 350 (see e.g., FIG. 3) to adjust the biomechanical motion of the avatar. The IK algorithms 350 may include algorithms based on Jacobian inverse techniques, cycle coordinate descent, and/or other like methods. In some embodiments, a particular IK algorithm 350 may be used (or modified) based on the particular biomechanical motion being simulated. For example, a first IK algorithm may be used to simulate a baseball bat swing and a second IK algorithm may be used to simulate a shotput throw. Using the IK algorithms 350, the avatar engine 410 may determine a PO of each sensor data point of the sensor data 270; adjust a PO of each avatar data point in the end-effector set to match the PO of a corresponding one of the sensor data points; determine, using the IK algorithms 350, a desired PO for each avatar data point in each corresponding set based on the PO of each avatar data point in the end-effector set; and adjust a PO of each avatar data point in each corresponding set to match the desired PO of each avatar data point in each corresponding set. An example of the aforementioned processes is shown by FIGS. 5-7.

Figure 5:
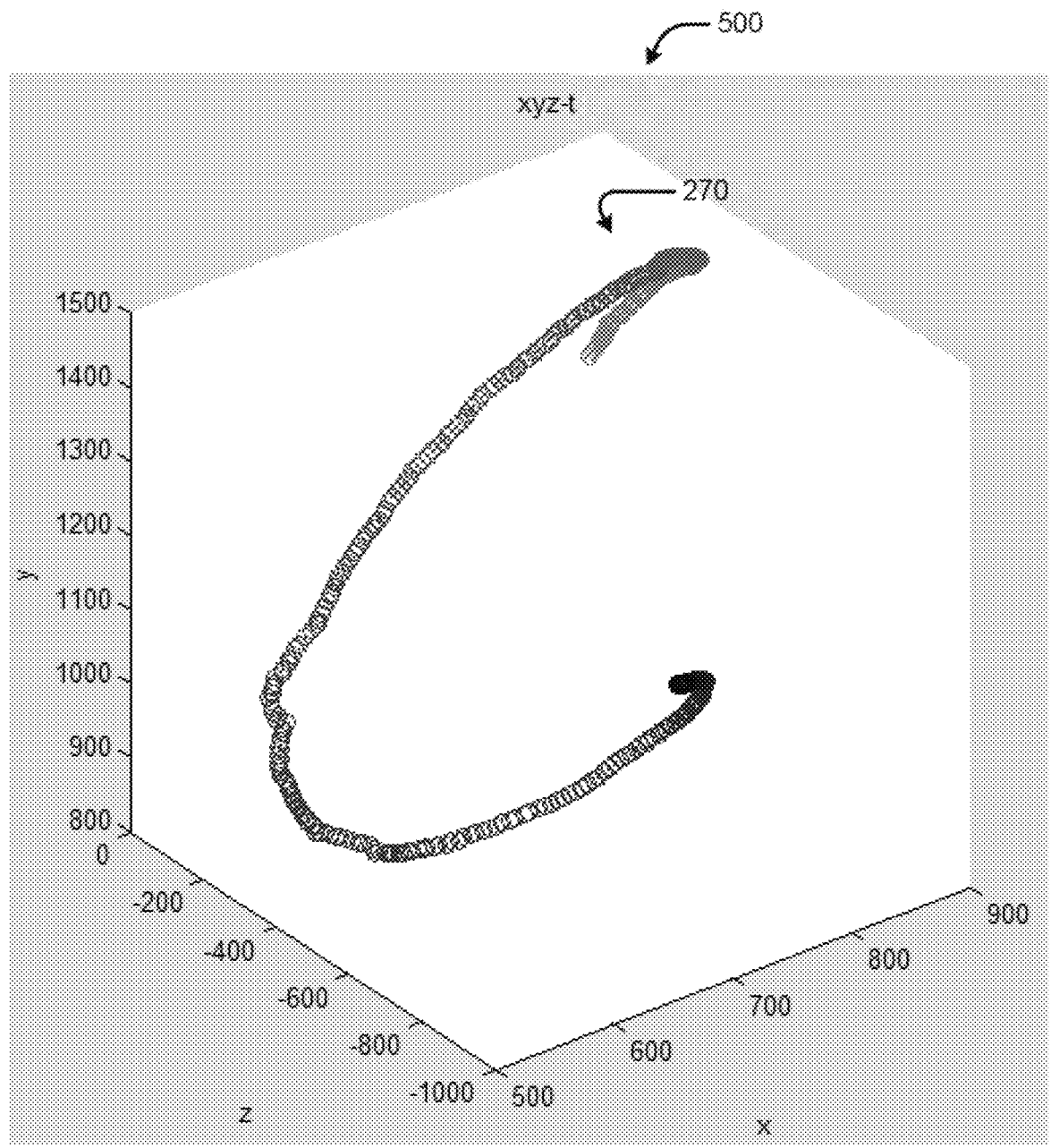
FIG. 5 illustrates an example sensor spatial domain with captured sensor data, in accordance with various embodiments.
Figure 6:
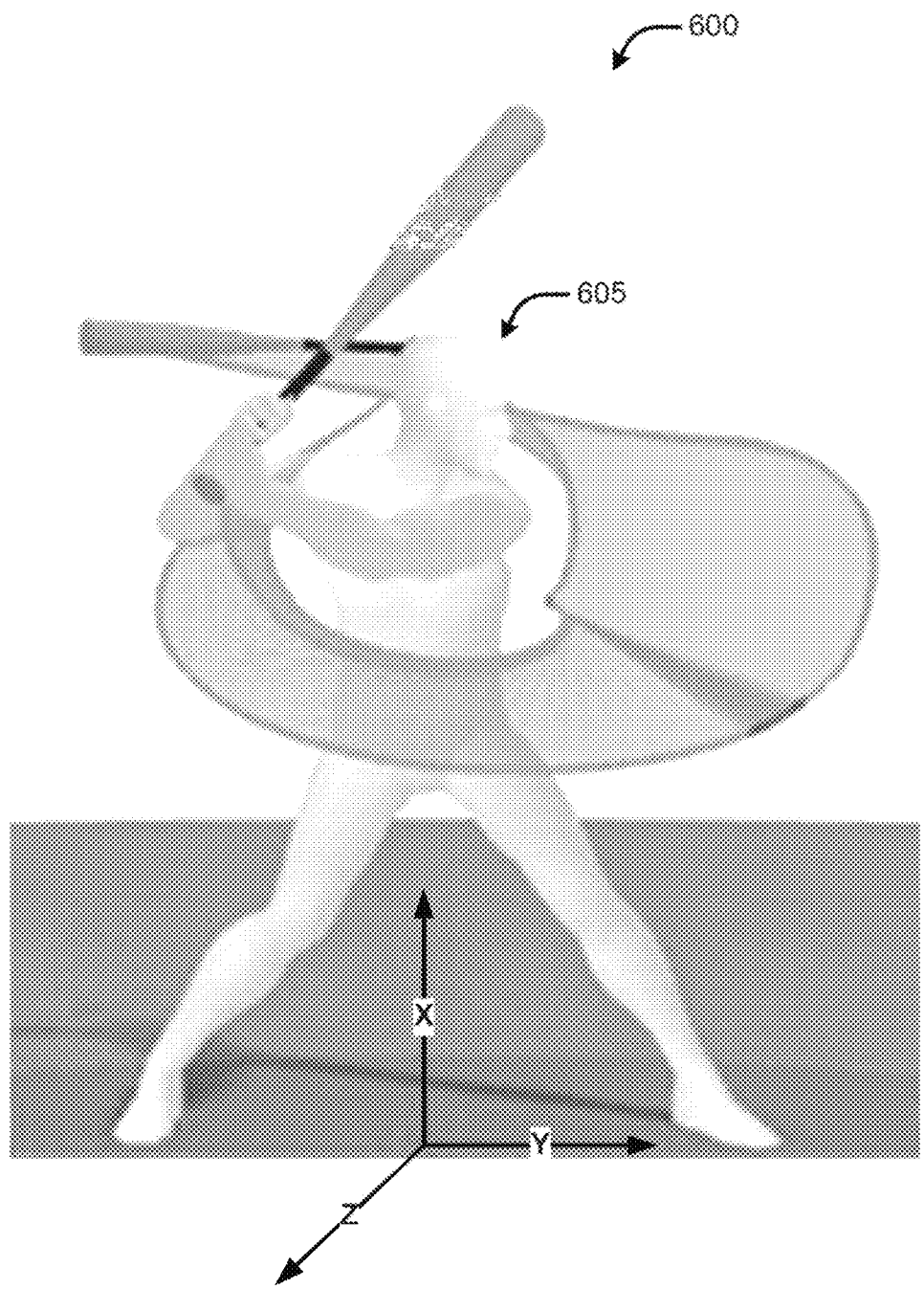
FIG. 6 illustrates an example avatar spatial domain, in accordance with various embodiments.

FIG. 5 illustrates an example sensor spatial domain 500 with captured sensor data 270, in accordance with various embodiments. The sensor spatial domain 500 may be a three dimensional (3D) coordinate system, with an x-axis, y-axis, and z-axis. In the example shown by FIG. 5, the captured sensor data 270 is represented by a plurality of circles in the sensor spatial domain 500. In the example shown by FIG. 5, the sensor data set 270 may be based on sensor data captured by the sensors 250 of the computer device 200, which is attached to the user's wrist as shown by FIG. 1. The sensor data set 270 may represent the trajectory of the user's wrist through space and time as the user swings a baseball bat (also referred to as a "swing action"). The sensor data set 270 may then be used to adjust the kinematic chain 104 of an avatar to simulate the user's full-body swing action. FIG. 6 illustrates an example avatar 605 in an avatar spatial domain 600, in accordance with various embodiments. As shown by FIG. 6, the avatar spatial domain 600 has its own x-, y-, and z-axes with an origin point located at a middle point between the two feet of the avatar 605 and on the ground of the avatar spatial domain 600. As shown by FIG. 6, the x-axis points to the left foot of the avatar 605, the y-axis points to upper-right of the avatar spatial domain 600, and z-axis is perpendicular to the x-y plane and points in and out of the figure. In various embodiments, the avatar 605 may be a template avatar that is adjusted based on the sensor data set 270. However, because the sensor data set 270 and data of the avatar 605 come from different sources, their scale, coordinate systems, and sampling rates are likely different from one another. Therefore, in various embodiments, the sensor spatial domain 500 and the avatar spatial domain 600 may be aligned (or "normalized") to a uniform scale and a coordinate system. This alignment process may be referred to as "spatial alignment." In embodiments, an iterative closest points (ICP) matching algorithm may be used to perform the spatial alignment. ICP matching may a align two data point sets (or two clouds of points) by transforming (e.g., translating and rotating) a source data point set to best match a reference data point set. The ICP matching algorithm may iteratively revise the transformation to minimize the distance from the source data point set to the reference data point set.

In embodiments, after the sensor spatial domain 500 is aligned with the avatar spatial domain 600, the spatial domains may be aligned temporally. Alignment of the temporal domains may be appropriate when the sensors 250 have sampling rates that are greater than that of the avatar 605. For example, in some cases the sensors 250 may obtain hundreds of samples for a period of time (e.g., samples per second) while the avatar 605 may only have about 25 relative samples for that period of time (e.g., frames per second). To align the temporal domains, in various embodiments avatar data points of the avatar 605 may be interpolated in time (e.g., using linear interpolation, quaternion interpolation, and the like) to obtain the same sampling rate density (e.g., the same or similar number of samples) as the sensors 250.

Figure 7:
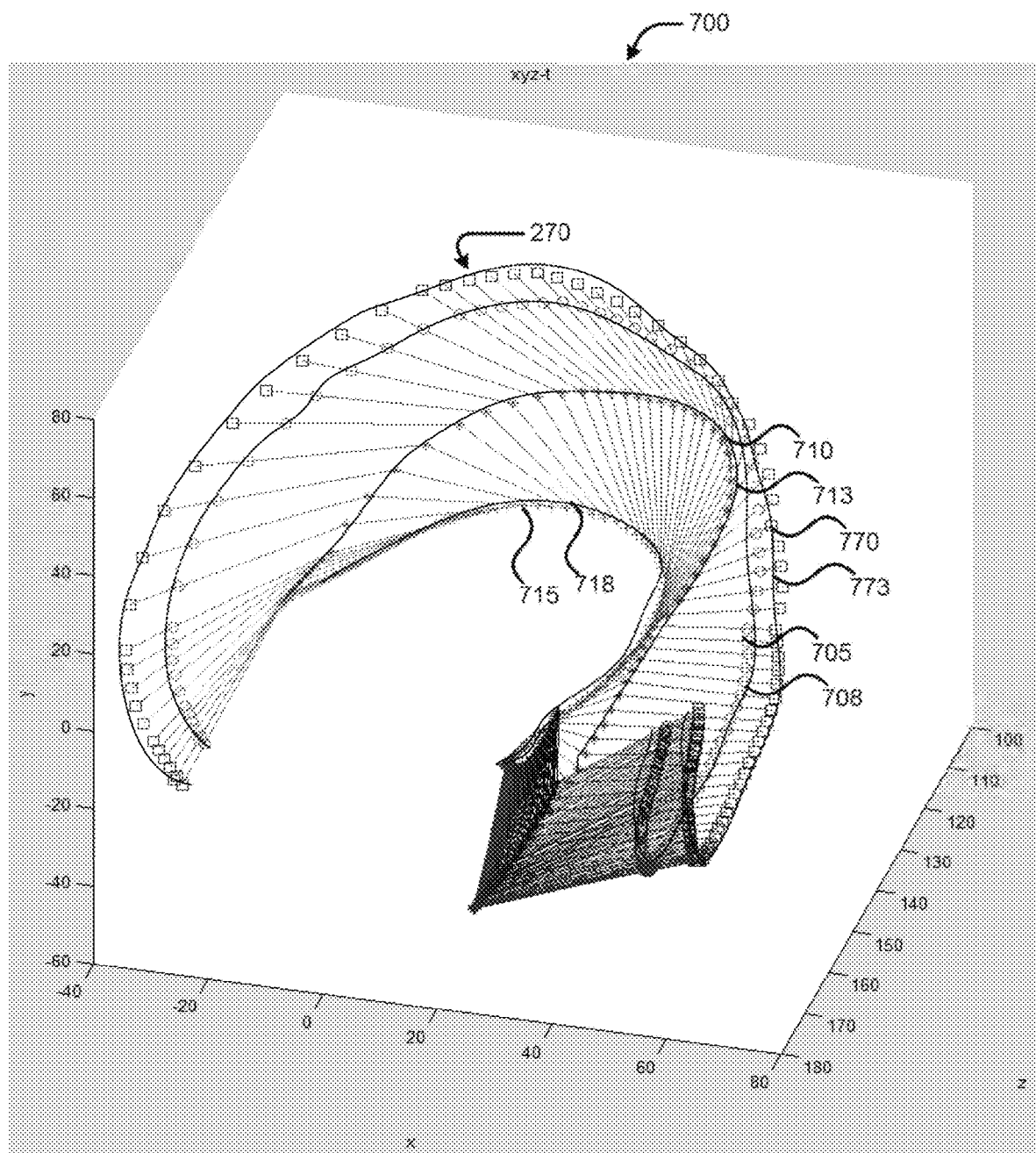
FIG. 7 shows and example of a spatially and temporally aligned domain, in accordance with various embodiments.

FIG. 7 shows and example of an aligned spatial temporal domain 700 (also referred to as an "aligned domain 700"), in accordance with various embodiments. The aligned domain 700 may include the sensor data 270, which includes a collection of sensor data points 770 (each sensor data point 770 is represented by a square "□" in FIG. 7. The sensor data points 770 may travel along path 773 (represented by the line through the squares □ in FIG. 7). The sensor data points 770 may be collectively referred to as "sensor data 270" and/or a "sensor data set 270." Each of the sensor data points 770 may correspond to individual avatar data points 705 (each of which are represented by a circle "○" in FIG. 7), which may travel along a track 708 (represented by the line through the circles ○ in FIG. 7). The avatar data points 705 may be collectively referred to as an "avatar data set 705." The aligned domains 700 also includes avatar data points 710 (each of which are represented by a star "★" in FIG. 7) that may travel along track 713 (represented by the line through the stars ★ in FIG. 7), and avatar data points 715 (each of which are represented by a cross "+" in FIG. 7) that may travel along track 718 (represented by the line through the crosses + in FIG. 7). The avatar data points 710 to may be collectively referred to as an "avatar data set 710," and the avatar data points 715 may be collectively referred to as an "avatar data set 715." Each of the avatar data sets 705, 710, and 715 may be associated with a corresponding joint of the avatar shown by FIG. 6.

As shown by FIG. 7, the spatial domain of the sensor data and the avatar are aligned to occupy the same spatial coordinate system xyz-t. Furthermore, alignment of the temporal domain is represented by each line connecting individual sensor data points from the path 773 with individual avatar data points from tracks 708, 713, and 718. The lines intersecting the data points of each path/track, and the data points connected by a line, may represent an individual time instance.

In embodiments, prior to alignment with the sensor domain 500, the avatar 600 may have predetermined values for each of the avatar data sets 705, 710, and 715. When each of the avatar data sets 705, 710, and 715 has predetermined values, the avatar 605 may be a "template avatar." The predetermined values for each of the avatar data sets 705, 710 and 715 may be generated or set by an owner/operator of the application server 120. In the example shown by FIG. 7, the sensor data points 770 may be captured from sensor(s) 250 of computer device 200 attached to a wrist joint of the user. The aligned domain 700 may be produced using an ICP matching algorithm and using interpolation techniques (e.g., using linear interpolation quaternion interpolation, and the like) such that the aligned domain 700 has a uniform scale and sampling rate between the avatar 605 and the user's swing action. After the aligned domain 700 is generated, the joint POs of the avatar 605 may be adjusted to substantially match estimated/predicted joint POs of the user.

In the example shown by FIGS. 5-7, only the wrist joint 130 of the avatar 605 can be adapted to match the user's wrist joint POs since the computer device 200 is only attached to the user's wrist. However, since the human body is connected in a hierarchical bone structure, the POs of the user's other joints may be predicted or estimated based on the captured sensor data 270. For example, when the user's wrist POs change, the POs of children joints of the wrist (e.g., finger and/or hand joints), parent joints of the wrist (e.g., an elbow), the parent's parent joints (e.g., shoulder joint, etc.), and so forth will also change. In addition, the POs of the wrist without the attached computer device 200 may be adjusted according to a relative offset between the two wrists' since the baseball bat swing action typically requires a user to hold the baseball bat with both hands. This offset may be used to predict the POs of the other wrist and corresponding child joint, parent joint, parent's parent joint, etc. However, such an offset may not be applicable for other types of biomechanical motions, and alternative offsets, parameters, or criteria may be used for various body parts based on the particular biomechanical motion(s) to be simulated and/or equipment used during when performing the biomechanical motions.

The prediction/estimation of the impacts of POs of one joint on the POs of other joints may be determined using the IK algorithms 350. Using the predictions/estimations provided by the IK algorithms 350, the avatar engine 410 may adjust the POs of the avatar joints 130 (e.g., the POs of the avatar data sets 705, 710, and 715). In embodiments, the avatar data points 705 corresponding to the wrist joint of the avatar 605 may be used as the end-effector 130E. In such embodiments, IK technology may be used to determine desired POs of other joints 130 of the avatar 605 directly or indirectly connected to the end-effector joint 130E. In embodiments, the desired POs of the end-effector 130E may be used to predict/estimate the POs of each individual avatar data point 705, 710, and 715 and the tracks 708, 713, 718. For example, using each data point of the end-effector set (e.g., each avatar data point 705) as an input to the IK algorithms 350, the avatar engine 410 may obtain or determine a desired PO of a right elbow (e.g., avatar data set 710), a desired PO of a right shoulder (e.g., avatar data set 715), a desired PO of the user's clavicle (not shown by FIG. 7), a desired PO of the user's pelvis (not shown by FIG. 7), and one or more other joints 130 and/or avatar segments 125 at individual time instances (e.g., lines connecting individual data points of the path 773 and tracks 708, 713, and 718).

In some embodiments, the avatar engine 410 may obtain user information (e.g., height measurements, individual limb measurements, weight measurements, age, etc.), and use the user information as another input to the IK algorithms 350 to further refine the POs of the individual avatar data points 705, 710, and 715 and the tracks 708, 713, 718. In addition to refining the POs of the individual data points the user information may also be used to adjust the height, limb lengths, etc. of the template avatar 605. In embodiments, the user information may be collected via a user interface (e.g., provided by an application implemented by the computer device 105), derived based on the relative positions between multiple sensors affixed to different body parts of the user, and/or the like. Additionally, in some embodiments, the avatar engine 410 may utilize environmental information (e.g., air or water temperature, wind speed and direction, humidity, barometric pressure or altitude, etc.) to further refine the POs of the individual avatar data points 705, 710, and 715 and the tracks 708, 713, 718. Furthermore, in some embodiments the avatar engine 410 may utilize previously recorded sensor data and/or avatar data, such as by using a user's previously adjusted avatar (e.g., during a previous swing or from a previously recorded session) as the template avatar. In this way, the POs for each avatar data set may require fewer adjustments for consecutively performed biomechanical motions, which may result in using less computation resources to determine the desired POs and for subsequent rendering.

Referring back to FIG. 4, once the avatar engine 410 aligns the spatial and temporal domains, the avatar engine 410 may provide the aligned domains to the rendering engine 355. The rendering engine 355 may then generate an animation 460 of the avatar based on the aligned spatial and temporal domains. In embodiments, the preloaded avatar may comprise a plurality of keyframes, which may be based on the avatar data points at each individual time instance. This may be referred to as a "template animation." The rendering engine 355 may use the adjusted avatar data points obtained from the avatar engine 410 to adjust the avatar 605's keyframes and/or generate new frames for the simulated biomechanical animation 460. For example, referring back to FIG. 7, each avatar data point 705/710/715 of the tracks 708/713/713 may represent a keyframe of the adjusted avatar, and each keyframe may represent a point in time or individual time instance (e.g., each line intersecting individual data points of the tracks 708, 713, and 713 in FIG. 7). The rendering engine 355 may revise or adjust the keyframes of the template avatar 605 to correspond with the adjusted POs discussed previously. The rendering engine 355 may also use linear interpolation, quaternion interpolation, or some other suitable technique to generate one or more frames to be placed between the keyframes. For example, referring back to FIG. 7, the space along each track 708/713/718 between each data point 705/710/715 may be the one or more frames generated by the rendering engine 355. The interpolation techniques may provide for a smooth or natural looking animation of the adjusted avatar. The rendering engine 355 may combine the plurality of keyframes and the one or more frames in sequential order to generate the animation. Rendering engine technologies are generally well known, and a description of the specific functionality of the rendering engine 355 is omitted for brevity. Once the animation is generated, the rendering engine 355 may store the animation in the avatar DB 370 and/or provide the animation 460 to the display device 530 via the I/O interface 335. In some embodiments, the rendering engine 355 may provide the animation 460 to application server 120 via NIC 330 or communications circuitry 305, which may be used for further analysis.

The display device 440 may operate in conjunction with the display module 340 (shown and described with regard to FIG. 3) display or render the generated animation 460. Display device 440 may be any type of output device that is capable of presenting information in a visual form based on received electrical signals. Display device 440 may be a light-emitting diode (LED) display device, an organic LED (OLED) display device, a liquid crystal display (LCD) device, a quantum dot display device, a projector device, and/or any other like display device. Furthermore, in various embodiments, the display device 440 may be a touchscreen input device wherein a user may provide one or more inputs to the computer device 300 through one or more gestures by touching the display device 440 with a stylus/pen and/or one or more fingers. The aforementioned display device technologies are generally well known, and a description of the functionality of the display device 440 is omitted for brevity.

Figure 8:
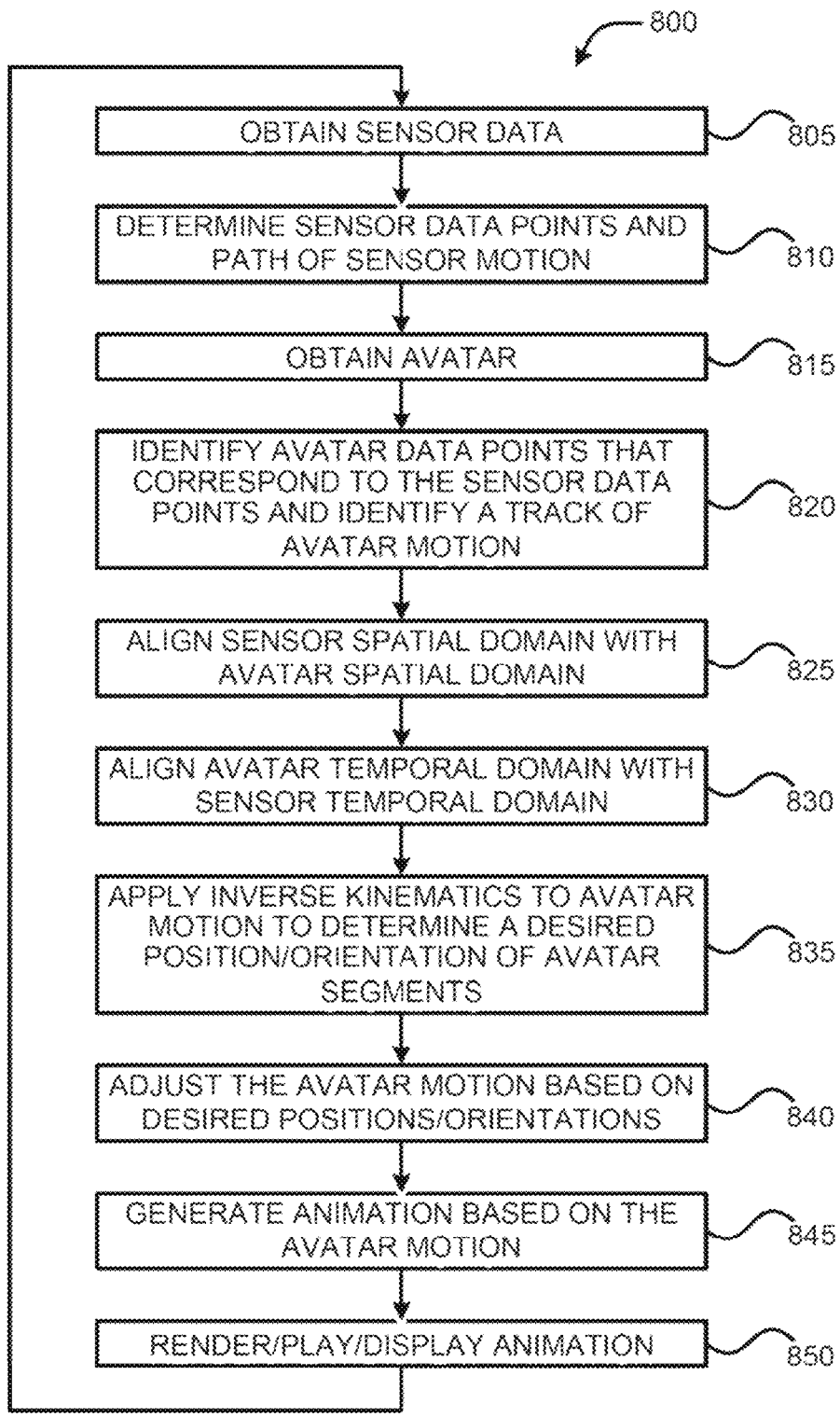
FIG. 8 illustrates an example process of generating and providing simulated biomechanical feedback for display, in accordance with various embodiments.

FIG. 8 illustrates an example process 800 of the BFG 400, in accordance with various embodiments. Process 800 may be performed by a computer device, which may include one or more computer-readable media (for example, CRM 320 shown and described with regard to FIG. 3 or CRM 904 shown and described with regard to FIG. 9) having instructions or program code, stored thereon, that when executed by one or more processors the computer device (for example, one or more processors or processor circuitry 315 shown and described with regard to FIG. 3), causes the computer device to perform process 800. For illustrative purposes, the operations of process 800 are described as being performed by computer device 300 of FIGS. 3-4 in conjunction with the elements of FIG. 1. The operations described correspond to the algorithmic logic or the described logic performing the operations. However, it should be noted that other computing devices may operate the process 800 in a multitude of arrangements and/or environments. While particular examples and orders of operations are illustrated in FIG. 8, in various embodiments, these operations may be re-ordered, separated into additional operations, combined or omitted altogether. In some embodiments, the operation illustrated in FIG. 8 may be combined with operations described with regard to other example embodiments and/or one or more operations described with regard to the non-limiting examples provided herein.

Referring to FIG. 8, at operation 805, the computer device 300 may obtain sensor data via from computer device 200 via communications circuitry 305. At operation 810, the computer device 200 (through analyzer 405) may determine sensor data points and a path of a sensor motion (e.g., sensor data points 270 and path 273 shown and described with regard to FIG. 7).

At operation 815, the computer device (through avatar engine 410) may obtain an avatar (e.g., from avatar DB 370 and/or from application server 120). At operation 820, the computer device 300 may identify or determine avatar data points that correspond to the sensor data points (e.g., data points of the end-effector set 705 shown and described with regard to FIG. 7) and a track of the avatar motion (e.g., track 708 shown and described with regard to FIG. 7).

At operation 825, the computer device 300 (through avatar engine 410) may align the sensor spatial domain with the avatar spatial domain such that they occupy the same spatial domain or coordinate system. At operation 830, the computer device (through avatar engine 410) may align the avatar temporal domain with the sensor temporal domain such that the avatar data points are aligned or synchronized in time with the sensor data points (e.g., the lines intersecting the end-effector data points 705 and the sensor data points 270 shown and described with regard to FIG. 7).

At operation 835, the computer device 300 (through avatar engine 410) may apply inverse kinematics (e.g., inverse kinematics algorithms 350 shown and described with regard to FIG. 3) to the avatar motion to determine a desired PO of one or more avatar segments 125 and/or joints 130. At operation 840, the computer device (through avatar engine 410) may adjust the avatar segments 125 and/or joints 130 based on the desired POs of the one or more avatar segments 125 and/or joints 130. At operation 845, the computer device 300 (through rendering engine 355) may generate an avatar animation 460 based on the adjust avatar motion, and at operation 850, the computer device 300 (through display module 340) may render, play, or otherwise provide the animation 460 for display.

Figure 9:
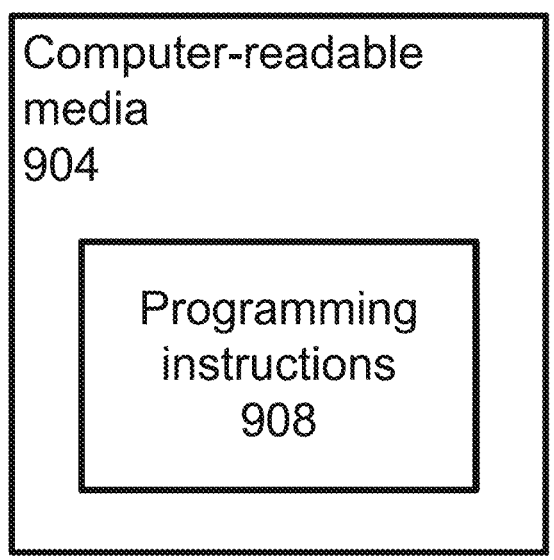
FIG. 9 illustrates an example computer-readable media, in accordance with various example embodiments.

FIG. 9 illustrates an example computer-readable media 904 that may be suitable for use to store instructions that cause an apparatus, in response to execution of the instructions by the apparatus, to practice selected aspects of the present disclosure. In some embodiments, the computer-readable media 904 may be non-transitory. In some embodiments, computer-readable media 904 may correspond to CRM 220, CRM 320, and/or any other computer-readable media discussed herein. As shown, computer-readable storage medium 904 may include programming instructions 908. Programming instructions 908 may be configured to enable a device, for example, computer devices 200, computer device 300, or some other unstable device, in response to execution of the programming instructions 908, to implement (aspects of) any of the methods or elements described throughout this disclosure related to generating and displaying biomechanical motion simulations and/or animations. In some embodiments, programming instructions 908 may be disposed on computer-readable media 904 that is transitory in nature, such as signals.

Any combination of one or more computer-usable or computer-readable media may be utilized. The computer-usable or computer-readable media may be, for example, but not limited to, an electronic, magnetic, optical, electromagnetic, infrared, or semiconductor system, apparatus, device, or propagation medium. More specific examples (a non-exhaustive list) of the computer-readable media would include the following: an electrical connection having one or more wires, a portable computer diskette, a hard disk, RAM, ROM, an erasable programmable read-only memory (for example, EPROM, EEPROM, or flash memory), an optical fiber, a portable compact disc read-only memory (CD-ROM), an optical storage device, a transmission media such as those supporting the Internet or an intranet, or a magnetic storage device. Note that the computer-usable or computer-readable media could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable media may be any medium that can contain, store, communicate, propagate, or transport the program for use by or in connection with the instruction execution system, apparatus, or device. The computer-usable media may include a propagated data signal with the computer-usable program code embodied therewith, either in baseband or as part of a carrier wave. The computer-usable program code may be transmitted using any appropriate medium, including but not limited to wireless, wireline, optical fiber cable, radio frequency, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN, WLAN, or WAN, or the connection may be made to an external computer (for example, through the Internet using an Internet Service Provider).

The present disclosure is described with reference to flowchart illustrations or block diagrams of methods, apparatus (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/act specified in the flowchart or block diagram block or blocks.

Some non-limiting Examples are provided below.

Example 1 may include a computer device to provide biomechanical feedback for display, the computer device comprising: one or more processors coupled with a memory; an analyzer to be operated by the one or more processors, the analyzer to determine, based on obtained sensor data, sensor data points in a sensor spatial domain; and determine, from the sensor data points, a path along which the sensor travels in the sensor spatial domain; an avatar engine to be operated by the one or more processors, the avatar engine to obtain an avatar, the avatar to include a set of avatar data points along a track in an avatar spatial domain; align the sensor spatial domain with the avatar spatial domain to obtain an aligned spatial domain; and synchronize the track with the path such that the track has a same duration as the path; and a rendering engine to be operated by the one or more processors, the render engine to generate an animation of the avatar based on the synchronization and the aligned spatial domain; and play the animation.

Example 2 may include the computer device of example 1 and/or some other examples herein, wherein the computer device is a first computer device and further comprises communications circuitry to obtain the sensor data from one or more sensors, wherein the one or more sensors are implemented in a second computer device that is communicatively coupled with the first computer device via the communications circuitry.

Example 3 may include the computer device of examples 1-2 and/or some other examples herein, wherein, to align the sensor spatial domain and the avatar spatial domain, the avatar engine is to: normalize the sensors data such that each avatar data point of the avatar data points corresponds to a sensor data point of the sensor data points.

Example 4 may include the computer device of examples 3 and/or some other examples herein, wherein, to synchronize the track with the path, the avatar engine is further to: generate new avatar data points when a number of avatar data points is less than a number of sensor data points, wherein a sum of the number of new avatar data points and the number of avatar data points equals the number of sensor data points; populate the set of avatar data points with the new avatar data points such that each avatar data point in the set of avatar data points is mapped to a corresponding sensor data point.

Example 5 may include the computer device of examples 1-4 and/or some other examples herein, wherein the avatar comprises a kinematic chain, and the kinematic chain comprises a plurality of avatar segments and an end-effector, wherein the set of avatar data points is an end-effector set, and each avatar segment of the plurality of avatar segments is associated with a corresponding set of avatar data points.

Example 6 may include the computer device or example 5 and/or some other examples herein, wherein the avatar comprises a plurality of keyframes, and each keyframe of the plurality of keyframes is representative of a point in time and includes one avatar data point from the end-effector set and from each corresponding set that is associated with the point in time.

Example 7 may include the computer device of example 6 and/or some other examples herein, wherein the avatar engine is to: determine a position and orientation, PO, of each sensor data point; adjust a PO of each avatar data point in the end-effector set to match the PO of a corresponding one of the sensor data points; determine, using an inverse kinematics algorithm, a desired PO for each avatar data point in each corresponding set based on the PO of each avatar data point in the end-effector set; and adjust a PO of each avatar data point in each corresponding set to match the desired PO of each avatar data point in each corresponding set.

Example 8 may include the computer device of example 7 and/or some other examples herein, wherein, to generate the animation, the rendering engine is to: generate, using linear interpolation or quaternion interpolation, one or more frames to be placed between two or more keyframes of the plurality of keyframes; and combine the plurality of keyframes and the one or more frames in sequential order.

Example 9 a may include the computer device of example 8 and/or some other examples herein, wherein the avatar engine is to obtain the avatar from an application sensor and control storage of the avatar in an avatar database, or the avatar engine is to obtain the avatar from the avatar database.

Example 10 may include the computer device of example 9 and/or some other examples herein, wherein the avatar obtained from the application server is a template avatar, and the avatar obtained from the avatar database is an avatar, which was previously adjusted based on previously recorded sensor data.

Example 11 may include the computer device of examples 2-10 and/or some other examples herein, wherein the analyzer is to determine, based on a position of the second computer device relative to a third computer device, a limb length or a height of the user of the first computer device, wherein the second computer device is coupled to a first body part of the user and the third computer device is coupled to a second body part of the user, and wherein the analyzer is to determine the position of the second computer device relative to the third computer device based on the sensor data obtained from the second computer device and other sensor data obtained from one or more other sensors implemented by the third computer device.

Example 12 may include the computer device of examples 1-11 and/or some other examples herein, wherein the computer device is a desktop personal computer (PC), laptop PC, tablet PC, a mobile phone, or an application server, and wherein the sensor is implemented in a system on chip (SoC) implemented in a wearable computer device coupled with a user of the wearable computer device or equipment used by the user.

Example 13 may include one or more computer-readable media including program code, that when executed by one or more processors of a computer device, causes the computer device to: identify, based on sensor data obtained from a sensor, sensor data points in a sensor spatial domain; determine, from the sensor data points, a path along which the sensor travels in the sensor spatial domain; obtain an avatar, wherein the avatar includes a set of avatar data points along a track in an avatar spatial domain; align the sensor spatial domain with the avatar spatial domain to obtain an aligned spatial domain; align a temporal domain of the track with avatar spatial domain of the path such that the avatar data points along the track occur at a same time as the sensor data points along the path; generate an animation of the avatar based on the aligned spatial domain and the aligned temporal domain; and provide the animation to be rendered. The one or more computer-readable media may be non-transitory computer readable media.

Example 14 may include the one or more computer-readable media of example 13 and/or some other examples herein, wherein, to align the sensor spatial domain and the avatar spatial domain, the computer device, in response to execution of the program code, is to: normalize the sensor data such that each avatar data point of the avatar data points corresponds to a sensor data point of the sensor data points.

Example 15 may in include the one or more computer-readable media of example 14 and/or some other examples herein, wherein, to align the temporal domain of the track with the temporal domain of the path, the computer device, in response to execution of the program code, is to: generate new avatar data points when a number of avatar data points is less than a number of sensor data points, wherein a sum of the number of new avatar data points and the number of avatar data points equals the number of sensor data points; populate the set of avatar data points with the new avatar data points such that each avatar data point in the set of avatar data points is mapped to a corresponding sensor data point.

Example 16 may include the one or more computer-readable media of examples 13-15 and/or some other examples herein, wherein the avatar comprises a kinematic chain, and the kinematic chain comprises a plurality of avatar segments and an end-effector, wherein the set of avatar data points is an end-effector set, and each avatar segment of the plurality of avatar segments is associated with a corresponding set of avatar data points.

Example 17 may include the one or more computer-readable media of example 14 and/or some other examples herein, wherein the avatar comprises a plurality of keyframes, and each keyframe of the plurality of keyframes is representative of a point in time and includes one avatar data point from the end-effector set and from each corresponding set that is associated with the point in time.

Example 18 may include the one or more computer-readable media of example 17 and/or some other examples herein, wherein the computer device, in response to execution of the program code, is to: determine a position and orientation, "PO", of each sensor data point; adjust a PO of each avatar data point in the end-effector set to match the PO of a corresponding one of the sensor data points; determine, using an inverse kinematics algorithm, a desired PO for each avatar data point in each corresponding set based on the PO of each avatar data point in the end-effector set; and adjust a PO of each avatar data point in each corresponding set to match the desired PO of each avatar data point in each corresponding set.

Example 19 may include the one or more computer-readable media of example 18 and/or some other examples herein, wherein, to generate the animation, the computer device, in response to execution of the program code, is to: generate, using linear interpolation or quaternion interpolation, one or more frames to be placed between two or more keyframes of the plurality of keyframes; and combine the plurality of keyframes and the one or more frames in sequential order.

Example 20 may include a method for providing biomechanical feedback for display, the method comprising: obtaining, by a computer device, sensor data obtained from a sensor; identifying, by the computer device based on the sensor data, sensor data points in a sensor spatial domain; determining, by the computer device from the sensor data points, a path along which the sensor travels in the sensor spatial domain; obtaining, by the computer device, an avatar, wherein the avatar includes a set of avatar data points along a track in an avatar spatial domain; aligning, by the computer device, the sensor spatial domain with the avatar spatial domain to obtain an aligned spatial domain; aligning, by the computer device, a temporal domain of the track with a temporal domain of the path such that the avatar data points along the track occur at a same time as the sensor data points along the path; generating, by the computer device, an animation of the avatar based on the aligned spatial domain and the aligned temporal domain; and providing, by the computer device, the animation to be displayed by a display device.

Example 21 may include the method of example 20 and/or some other examples herein, wherein aligning the sensor spatial domain and the avatar spatial domain comprises: normalizing, by the computer device, the sensor data such that each avatar data point of the avatar data points corresponds to a sensor data point of the sensor data points.

Example 22 may include the method of example 21 and/or some other examples herein, wherein aligning the temporal domain of the track with the temporal domain of the path comprises: generating, by the computer device, new avatar data points when a number of avatar data points is less than a number of sensor data points, wherein a sum of the number of new avatar data points and the number or avatar data points equals the number of sensor data points; populating, by the computer device, the set of avatar data points with the new avatar data points such that each avatar data point in the set of avatar data points is mapped to a corresponding sensor data point.

Example 23 may include the method of examples 20-22 and/or some other examples herein, wherein the avatar comprises a kinematic chain, and the kinematic chain comprises a plurality of avatar segments and an end-effector, wherein the set of avatar data points is an end-effector set, and each avatar segment of the plurality of avatar segments is associated with a corresponding set of as avatar data points.

Example 24 may include the method of example 23 and/or some other examples herein, wherein the avatar comprises a plurality of keyframes, and each keyframe of the plurality of keyframes is representative of a point in time and includes one avatar data point from the end-effector set and from each corresponding set that is associated with the point in time.

Example 25 may include the method of example 24 and/or some other examples herein, further comprising: determining, by the computer device, a position and orientation "PO", of each sensor data point; aligning, by the computer device, a PO of each avatar data point in the end-effector set to match the PO of a corresponding one of the sensor data points; determining, by the computer device, using an inverse kinematics algorithm, a desired PO for each avatar data point in each corresponding set based on the PO of each avatar data point in the end-effector set; and aligning, by the computer device, a PO of each avatar data point in each corresponding set to match the desired PO of each avatar data point in each corresponding set.

Example 26 may include the method of example 25 and/or some other examples herein, wherein generating the animation comprises: generating, by the computer device, using linear interpolation or quaternion interpolation, one or more frames to be placed between two or more keyframes of the plurality of keyframes; and combining, by the computer device, the plurality of keyframes and the one or more frames in sequential order.

Example 27 may include one or more computer readable media including instructions, which when executed by one or more processors of a computer device, causes the causes the computer device to perform the method of examples 20-26 and/or some other examples herein.

Example 28 may include a computer device to provide biomechanical feedback for display, the computer device comprising: communication means for obtaining sensor data from a sensor; analysis means for identifying or determining sensor data points in a sensor spatial domain based on the sensor data; and for determining a path along which the sensor travels in the sensor spatial domain based on the sensor data points; avatar means for obtaining an avatar, the avatar to include a set of avatar data points along a track in an avatar spatial domain; for aligning the sensor spatial domain with the avatar spatial domain to obtain an aligned spatial domain; and for aligning a temporal domain of the track with a temporal domain of the path such that movement of the track has a same duration as movement of the path; and rendering means for generating an animation of the avatar based on the aligned spatial domain and the aligned temporal domain; and for providing the animation to display means for display.

Example 29 may include the computer device of example 29 and/or some other examples herein, wherein the avatar means is for aligning the spatial domains by: normalizing the sensor data such that each avatar data point of the avatar data points corresponds to a sensor data point of the sensor data points.

Example 30 may include the computer device of example 29 and/or some other examples herein, wherein the avatar means for aligning the temporal domains by: generating new avatar data points when a number of avatar data points is less than a number of sensor data points, wherein a sum of the number of new avatar data points and the number of avatar data points equals the number of sensor data points; populating the set of avatar data points with the new avatar data points such that each avatar data point in the set of avatar data points is mapped to a corresponding sensor data point.

Example 31 may include the computer device of examples 28-30 and/or some other examples herein, wherein the avatar comprises a kinematic chain, and the kinematic chain comprises a plurality of avatar segments and an end-effector, wherein the set of avatar data points is an end-effector set, and each avatar segment of the plurality of avatar segments is associated with a corresponding set avatar data points.

Example 32 may include the computer device of example 31 and/or some other examples herein, wherein the avatar comprises a plurality of keyframes, and each keyframe of the plurality of keyframes is representative of a point in time and includes one avatar data point from the end-effector set and from each corresponding set that is associated with the point in time.

Example 33 may include the computer device of example 32 and/or some other examples herein, wherein the avatar means is further for: determining a position and orientation, "PO", of each sensor data point; aligning a PO of each avatar data point in the end-effector set to match the PO of a corresponding one of the sensor data points; determining using an inverse kinematics algorithm, a desired PO for each avatar data point in each corresponding set based on the PO of each avatar data point in the end-effector set; and aligning a PO of each avatar data point in each corresponding set to match the desired PO of each avatar data point in each corresponding set.

Example 34 may include the computer device of example 33 and/or some other examples herein, wherein the rendering means is for generating the animation by: generating using linear interpolation or quaternion interpolation, one or more frames to be placed between two or more keyframes of the plurality of keyframes; and combining the plurality of keyframes and the one or more frames in sequential order.

Example 35 may include a system to provide biomechanical feedback for display, the system comprising: a first computer device comprising: one or more first processors coupled with a first memory, one or more sensors, and first communications circuitry, wherein the one or more sensors are to capture and record sensor data representative of a motion of the first computer device, and the first communications circuitry to obtain sensor data from the one or more sensors, and transmit the sensor data to a second computer device; and the second computer device comprising: one or more second processors coupled with a second memory and second communications circuitry, and the second communications circuitry to receive the sensor data from the first computer device; an analyzer to be operated by the one or more second processors, the analyzer to determine, based on the sensor data, sensor data points in a sensor spatial domain; and determine, the sensor data points, a path along which the sensor travels in the sensor spatial domain; an avatar engine to be operated by the one or more second processors, the avatar engine to obtain an avatar from an avatar database, the avatar to include a set of avatar data points along a track in an avatar spatial domain; align the sensors spatial domain with the avatar spatial domain to obtain an aligned spatial domain; and synchronize the track with the path such that the track has a same duration as the path; and a rendering engine to be the operated by the one or more second processors, the render engine to generate an animation of the avatar based on the synchronization and the aligned spatial domain; and play the animation.

Example 36 may include the system of example 35 and/or some other examples herein, wherein, to align the sensor spatial domain and the avatar spatial domain, the avatar engine is to: normalize the sensor data such that each avatar data point of the avatar data points corresponds to a sensor data point of the sensor data points.

Example 37 may include the system of example 36 and/or some other examples herein, wherein, to synchronize the track with the path, the avatar engine is further to: generate new avatar data points when a number or avatar data points is less than a number or sensor data points, wherein a sum of the number of new avatar data points and the number of avatar data points equals the number of sensor data points; populate the set of avatar data points with the new avatar data points such that each avatar data point in the set of avatar data points is mapped to a corresponding sensor data point.

Example 38 may include the system of examples 35-37 and/or some other examples herein, wherein the avatar comprises a kinematic chain, and the kinematic chain comprises a plurality of avatar segments and an end-effector, wherein the set of avatar data points is an end-effector set, and each avatar segment of the plurality of avatar segments is associated with a corresponding set of avatar data points.

Example 39 may include the system of example 38 and/or some other examples herein, wherein the avatar comprises a plurality of keyframes, and each keyframe of the plurality of keyframes is representative of a point in time and includes one avatar data point from the end-effector set and from each corresponding set that is associated with the point in time.

Example 40 may include the system of example 39 and/or some other examples herein, wherein the avatar engine is to: determine a position and orientation, PO, of each sensor data point; adjust a PO of each avatar data point in the end-effector set to match the PO of a corresponding one of the sensor data points; determine, using an inverse kinematics algorithm, a desired PO for each avatar data point in each corresponding set based on the PO of each avatar data point in the end-effector set; and adjust a PO of each avatar data point in each corresponding set to match the desired PO of each avatar data point in each corresponding set.

Example 41 may include the system of example 40 and/or some other examples herein, wherein, to generate the animation, the rendering engine is to: generate, using linear interpolation or quaternion interpolation, one or more frames to be placed between two or more keyframes of the plurality of keyframes; and combine the plurality or keyframes and the one or more frames in sequential order.

Example 42 may include the system of examples 35-41 and/or some other examples herein, wherein the one or more first processors are to obtain the sensor data from the one or more sensors, provide the sensor data to the first communications circuitry, and control storage of the sensors data in the first memory before or after the sensor data is provided to the first communications circuitry.

Example 43 may include the system of example 42 and/or some other examples herein, wherein the one or more second processors are to control receipt of the avatar from an application server, control storage of the avatar in the avatar database, and control transmission of the generated animation to the application server for further analysis.

Example 44 may include the system of examples 35-43 and/or some other examples herein, wherein the first computer device is a system on chip (SoC) implemented in a wearable computer device coupled with a user of the wearable computer device or equipment used by the user, and the second computer device is a desktop personal computer (PC), laptop PC, tablet PC, a mobile phone, or the application server.

Although certain embodiments have been illustrated and described herein for purposes of description a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed is:
1. A computer system comprising:
processor circuitry coupled with memory circuitry and communicatively coupled with interface circuitry, wherein the interface circuitry is arranged to obtain sensor data from sensor circuitry;
the processor circuitry is arranged to operate an analyzer, the analyzer is arranged to determine, based on the sensor data, sensor data points in a sensor spatial domain; and determine, from the sensor data points, a path along which the sensor travels in the sensor spatial domain;

the processor circuitry is arranged to operate an avatar engine, the avatar engine is arranged to:
obtain an avatar, the avatar to include a set of avatar data points along a track in an avatar spatial domain,
align the sensor spatial domain with the avatar spatial domain to obtain an aligned spatial domain, and
synchronize the track with the path such that the track has a same duration as the path; and the processor circuitry is arranged to operate an a rendering engine, the rendering engine is arranged to generate an animation of the avatar based on the synchronization and the aligned spatial domain; and play the animation.

2. The computer system of claim 1, wherein, to align the sensor spatial domain and the avatar spatial domain, the avatar engine is arranged to:
normalize the sensor data such that each avatar data point of the avatar data points corresponds to a sensor data point of the sensor data points.

3. The computer system of claim 2, wherein, to synchronize the track with the path, the avatar engine is further to:
generate new avatar data points when a number of avatar data points is less than a number of sensor data points, wherein a sum of the number of new avatar data points and the number of avatar data points equals the number of sensor data points; and
populate the set of avatar data points with the new avatar data points such that each avatar data point in the set of avatar data points is mapped to a corresponding sensor data point.

4. The computer system of claim 1, wherein the avatar comprises a kinematic chain, and the kinematic chain comprises a plurality of avatar segments and an end-effector, wherein the set of avatar data points is an end-effector set, and each avatar segment of the plurality of avatar segments is associated with a corresponding set of avatar data points.

5. The computer system of claim 4, wherein the avatar comprises a plurality of keyframes, and each keyframe of the plurality of keyframes is representative of a point in time and includes one avatar data point from the end-effector set and from each corresponding set that is associated with the point in time.

6. The computer system of claim 5, wherein the avatar engine is arranged to:
determine a position and orientation (PO) of each sensor data point;
adjust a PO of each avatar data point in the end-effector set to match the PO of a corresponding one of the sensor data points;
determine, using an inverse kinematics algorithm, a desired PO for each avatar data point in each corresponding set based on the PO of each avatar data point in the end-effector set; and
adjust a PO of each avatar data point in each corresponding set to match the desired PO of each avatar data point in each corresponding set.

7. The computer system of claim 6, wherein, to generate the animation, the rendering engine is arranged to:
generate, using linear interpolation or quaternion interpolation, one or more frames to be placed between two or more keyframes of the plurality of keyframes; and
combine the plurality of keyframes and the one or more frames in sequential order.

8. The computer system of claim 7, wherein the avatar engine is arranged to obtain the avatar from an application server and control storage of the avatar in an avatar database, or the avatar engine is arranged to obtain the avatar from the avatar database.

9. The computer system of claim 1, wherein the computer system is a desktop personal computer (PC), a laptop PC, a tablet PC, a mobile phone, or an application server, and wherein the sensor is implemented in a system on chip (SoC) implemented in a wearable computer device coupled with a user of the wearable computer device or equipment used by the user.

10. One or more non-transitory computer-readable media (NTCRM) comprising instructions, wherein execution of the instructions is to cause a computer device to:
identify, based on sensor data obtained from a sensor, sensor data points in a sensor spatial domain;
determine, from the sensor data points, a path along which the sensor travels in the sensor spatial domain and in a sensor temporal domain;
obtain an avatar, the avatar includes a set of avatar data points along a track in an avatar spatial domain and in an avatar temporal domain;
align the sensor spatial domain with the avatar spatial domain to obtain an aligned spatial domain;
align the avatar temporal domain with the sensor temporal domain that the avatar data points along the track occur at a same time as the sensor data points along the path;
generate an animation of the avatar based on the aligned spatial domain and the aligned temporal domain; and
provide the animation to be rendered.

11. The one or more NTCRM of claim 10, wherein, to align the sensor spatial domain and the avatar spatial domain, execution of the instructions is to cause the computer device to:
normalize the sensor data such that each avatar data point of the avatar data points corresponds to a sensor data point of the sensor data points.

12. The one or more NTCRM of claim 11, wherein, to align the avatar temporal domain with the sensor temporal domain, execution of the instructions is to cause the computer device to:
generate new avatar data points when a number of avatar data points is less than a number of sensor data points, wherein a sum of the number of new avatar data points and the number of avatar data points equals the number of sensor data points; and
populate the set of avatar data points with the new avatar data points such that each avatar data point in the set of avatar data points is mapped to a corresponding sensor data point.

13. The one or more NTCRM of claim 12, wherein the avatar comprises a kinematic chain, and the kinematic chain comprises a plurality of avatar segments and an end-effector, wherein the set of avatar data points is an end-effector set, and each avatar segment of the plurality of avatar segments is associated with a corresponding set of avatar data points.

14. The one or more NTCRM media of claim 13, wherein the avatar comprises a plurality of keyframes, and each keyframe of the plurality of keyframes is representative of a point in time and includes one avatar data point from the end-effector set and from each corresponding set that is associated with the point in time.

15. The one or more NTCRM of claim 14, wherein execution of the instructions is to cause the computer device to:
determine a position and orientation (PO) of each sensor data point;

adjust a PO of each avatar data point in the end-effector set to match the PO of a corresponding one of the sensor data points;

determine, using an inverse kinematics algorithm, a desired PO for each avatar data point in each corresponding set based on the PO of each avatar data point in the end-effector set; and adjust a PO of each avatar data point in each corresponding set to match the desired PO of each avatar data point in each corresponding set.

16. The one or more NTCRM of claim 15, wherein, to generate the animation, execution of the instructions is to cause the computer device to:

generate, using linear interpolation or quaternion interpolation, one or more frames to be placed between two or more keyframes of the plurality of keyframes; and combine the plurality of keyframes and the one or more frames in sequential order.

17. A method for providing biomechanical feedback for display, the method comprising:

obtaining, by a computer device, sensor data obtained from a sensor;

identifying, by the computer device based on the sensor data, sensor data points in a sensor spatial domain;

determining, by the computer device from the sensor data points, a path along which the sensor travels in the sensor spatial domain and in a temporal domain;

obtaining, by the computer device, an avatar that includes a set of avatar data points along a track in an avatar spatial domain and temporal domain;

aligning, by the computer device, the sensor spatial domain with the avatar spatial domain to obtain an aligned spatial domain;

aligning, by the computer device, a temporal domain with a temporal domain such that the avatar data points along the track occur at a same time as the sensor data points along the path;

generating, by the computer device, an animation of the avatar based on the aligned spatial domain and the aligned temporal domain; and providing, by the computer device, the animation to be displayed by a display device.

18. The method of claim 17, wherein aligning the sensor spatial domain and the avatar spatial domain comprises:

normalizing, by the computer device, the sensor data such that each avatar data point of the avatar data points corresponds to a sensor data point of the sensor data points.

19. The method of claim 18, wherein aligning the temporal domain of the track with the temporal domain of the path comprises:

generating, by the computer device, new avatar data points when a number of avatar data points is less than a number of sensor data points, wherein a sum of the number of new avatar data points and the number of avatar data points equals the number of sensor data points; and populating, by the computer device, the set of avatar data points with the new avatar data points such that each avatar data point in the set of avatar data points is mapped to a corresponding sensor data point.

20. The method of claim 17, wherein the avatar comprises a kinematic chain, and the kinematic chain comprises a plurality of avatar segments and an end-effector, wherein the set of avatar data points is an end-effector set, and each avatar segment of the plurality of avatar segments is associated with a corresponding set of avatar data points.

21. The method of claim 20, wherein the avatar comprises a plurality of keyframes, and each keyframe of the plurality of keyframes is representative of a point in time and includes one avatar data point from the end-effector set and from each corresponding set that is associated with the point in time.

22. The method of claim 21, further comprising:

determining, by the computer device, a position and orientation (PO) of each sensor data point;

aligning, by the computer device, a PO of each avatar data point in the end-effector set to match the PO of a corresponding one of the sensor data points;

determining, by the computer device, using an inverse kinematics algorithm, a desired PO for each avatar data point in each corresponding set based on the PO of each avatar data point in the end-effector set; and aligning, by the computer device, a PO of each avatar data point in each corresponding set to match the desired PO of each avatar data point in each corresponding set.

23. The method of claim 22, wherein generating the animation comprises:

generating, by the computer device, using linear interpolation or quaternion interpolation, one or more frames to be placed between two or more keyframes of the plurality of keyframes; and combining, by the computer device, the plurality of keyframes and the one or more frames in sequential order.

24. A computing system, comprising:

one or more processors coupled with a memory and communicatively coupled with communications circuitry, wherein the communications circuitry is arranged to receive sensor data from a wearable computer device, the wearable device comprising at least one sensor, and wherein the one or more processors are arranged to execute instructions to:

determine, based on the sensor data, sensor data points in a sensor spatial domain, determine, from the sensor data points, a path along which the at least one sensor travels in the sensor spatial domain and sensor temporal domain, obtain an avatar from an avatar database or from an application server, the avatar including a set of avatar data points along a track in an avatar spatial domain and an avatar temporal domain, align the sensor spatial domain with the avatar spatial domain to obtain an aligned spatial domain, align the avatar temporal domain with the sensor temporal domain such that the avatar data points along the track occur at a same time as the sensor data points along the path, control storage of the aligned avatar in the avatar database, generate an animation of the avatar based on the synchronization and the aligned spatial domain, and play the animation.

25. The computing system of claim 24, wherein:

the computer system is a desktop personal computer (PC), a laptop PC, a tablet PC, a mobile phone, or an application server, the wearable computer device comprises a system on chip (SoC), and the SoC comprises the at least one sensor, and the wearable computer device is arranged to couple to a body part of a user or is arranged to couple to equipment used by the user.

* * * * *

UNITED STATES PATENT AND TRADEMARK OFFICE
CERTIFICATE OF CORRECTION

PATENT NO. : 10,748,320 B2
APPLICATION NO. : 16/326888
DATED : August 18, 2020
INVENTOR(S) : Xiaofeng Tong et al.

Page 1 of 1

It is certified that error appears in the above-identified patent and that said Letters Patent is hereby corrected as shown below:

In the Claims

Column 31, Line 12:
"…operate an a rendering engine…"
Should read:
"…operate a rendering engine…"

Signed and Sealed this
Twentieth Day of October, 2020

Andrei Iancu
*Director of the United States Patent and Trademark Office*